(12) United States Patent
Watanabe et al.

(10) Patent No.: US 8,700,567 B2
(45) Date of Patent: Apr. 15, 2014

(54) INFORMATION APPARATUS

(75) Inventors: Yasuo Watanabe, Machida (JP); Shoji Kodama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 491 days.

(21) Appl. No.: 13/063,418

(22) PCT Filed: Feb. 28, 2011

(86) PCT No.: PCT/JP2011/001141
§ 371 (c)(1),
(2), (4) Date: Mar. 10, 2011

(87) PCT Pub. No.: WO2012/117433
PCT Pub. Date: Sep. 7, 2012

(65) Prior Publication Data
US 2012/0221532 A1    Aug. 30, 2012

(51) Int. Cl.
*G06F 7/00* (2006.01)
*G06F 17/00* (2006.01)

(52) U.S. Cl.
USPC ............. 707/610; 707/609; 707/640

(58) Field of Classification Search
USPC .......................... 707/609, 610, 640
See application file for complete search history.

(56) References Cited

U.S. PATENT DOCUMENTS

| | | | | |
|---|---|---|---|---|
| 5,517,632 | A * | 5/1996 | Matsumoto et al. | 711/114 |
| 5,737,763 | A * | 4/1998 | Hilditch | 711/162 |
| 5,941,947 | A * | 8/1999 | Brown et al. | 709/225 |
| 2005/0086294 | A1 | 4/2005 | Kodama | |
| 2006/0047649 | A1 * | 3/2006 | Liang | 707/4 |
| 2009/0119395 | A1 | 5/2009 | Kodama | |

FOREIGN PATENT DOCUMENTS

JP    2009-116414    5/2009
WO    WO 2010/064328 A1    6/2010

OTHER PUBLICATIONS

PCT International Search Report on application No. PCT/JP2011/001141 dated Nov. 30, 2011; 3 pages.

* cited by examiner

*Primary Examiner* — Rehana Perveen
*Assistant Examiner* — Huen Wong
(74) *Attorney, Agent, or Firm* — Foley & Lardner LLP

(57) ABSTRACT

The present invention enables a unified way of accessing files generated by application programs configured to store contents in files in different formats, without using a conversion program.
A database for holding correspondence between an identifier of a content and a storage position of the content is generated based on a backup catalog generated by a backup server, and contents are accessed by using this database. Contents generated by a plurality of different application programs are accessed in a unified way using a single name space.

12 Claims, 32 Drawing Sheets

Fig. 13

BACKUP CATALOG INFORMATION MANAGEMENT TABLE FOR NAS 5400

| CONTENT IDENTIFICATION INFORMATION 5401 | | GENERATION INFORMATION 5402 | RELATION WITH PREVIOUS GENERATION 5403 | STORAGE POSITION INFORMATION 5404 | | METADATA 5405 | |
|---|---|---|---|---|---|---|---|
| SHARE NAME | FILE PATH | | | OFFSET | DATA LENGTH | UPDATE TIME | ACCESS CONTROL INFORMATION |
| ShareA | /dirA/fileA | GENERATION 1 | ADDED | 0 | 4096 | | UserA, GroupA |
| ShareA | /dirA/fileB | GENERATION 1 | ADDED | 4096 | 4096 | | UserB, GroupA |
| .. | .. | .. | .. | .. | .. | .. | .. |
| ShareA | /dirA/fileA | GENERATION 2 | UPDATED | 0 | 4096 | | UserA, GroupA |
| ShareA | /dirA/fileB | GENERATION 2 | DELETED | N/A | N/A | | UserB, GroupA |
| .. | .. | .. | .. | .. | .. | .. | .. |

BACKUP CATALOG INFORMATION MANAGEMENT TABLE FOR MAIL 5500

| CONTENT IDENTIFICATION INFORMATION 5501 | | GENERATION INFORMATION 5502 | RELATION WITH PREVIOUS GENERATION 5503 | STORAGE POSITION INFORMATION 5504 | | METADATA 5505 | |
|---|---|---|---|---|---|---|---|
| ACCOUNT INFORMATION | MAIL ID | | | OFFSET | DATA LENGTH | UPDATE TIME | ACCESS CONTROL INFORMATION |
| UserA | Mail1 | GENERATION 1 | ADDED | 0 | 4096 | | UserA, GroupA |
| UserA | Mail2 | GENERATION 1 | ADDED | 4096 | 4096 | | UserA, GroupA |
| .. | .. | .. | | .. | .. | | .. |
| 5501a | 5501b | | | 5504a | 5504b | 5505a | 5505b |

Fig. 15

BACKUP CATALOG INFORMATION MANAGEMENT TABLE FOR COLLABORATION 5600

| CONTENT IDENTIFICATION INFORMATION | | GENERATION INFORMATION | RELATION WITH PREVIOUS GENERATION | STORAGE POSITION INFORMATION | | METADATA | |
|---|---|---|---|---|---|---|---|
| PROJECT INFORMATION | FILE PATH | | | OFFSET | DATA LENGTH | UPDATE TIME | ACCESS CONTROL INFORMATION |
| ProjectA | /dirA/fileA | GENERATION 1 | ADDED | 0 | 4096 | | UserA, GroupA |
| ProjectA | /dirA/fileB | GENERATION 1 | ADDED | 4096 | 4096 | | UserB, GroupA |
| .. | .. | .. | .. | .. | .. | .. | .. |

5601 — CONTENT IDENTIFICATION INFORMATION (5601a: PROJECT INFORMATION, 5601b: FILE PATH)
5602 — GENERATION INFORMATION
5603 — RELATION WITH PREVIOUS GENERATION
5604 — STORAGE POSITION INFORMATION (5604a: OFFSET, 5604b: DATA LENGTH)
5605 — METADATA (5605a: UPDATE TIME, 5605b: ACCESS CONTROL INFORMATION)

Fig. 16

| GLOBAL CONTENT IDENTIFICATION INFORMATION | GENERATION INFORMATION | STORAGE POSITION INFORMATION | | | METADATA | |
|---|---|---|---|---|---|---|
| | | FILE | OFFSET | DATA LENGTH | UPDATE TIME | ACCESS CONTROL INFORMATION |
| /NAS/ShareA/dirA/fileA | GENERATION 1 | File_a | 0 | 4096 | .. | UserA, GroupA |
| .. | .. | .. | .. | .. | .. | .. |
| /Email/UserA/Mail1 | GENERATION 1 | File_b | 0 | 4096 | .. | UserA, GroupA |
| .. | .. | .. | .. | .. | .. | .. |
| /Collaboration/ProjectA/dirA/fileA | GENERATION 1 | File_c | 0 | 4096 | .. | UserC, GroupA |
| .. | .. | .. | .. | .. | .. | .. |

AGGREGATION DATA MANAGEMENT TABLE 3500

ALIAS MANAGEMENT TABLE 3800

| ALIAS OF GLOBAL CONTENT IDENTIFICATION INFORMATION 3801 | ASSOCIATED GLOBAL CONTENT IDENTIFICATION INFORMATION 3802 | ASSOCIATED GENERATION INFORMATION 3803 |
|---|---|---|
| /.snap/2010-10-8/NAS/ShareA/dirA/fileA | /NAS/ShareA/dirA/fileA | GENERATION 1 |
| /.snap/2010-10-9/NAS/ShareA/dirA/fileA | /NAS/ShareA/dirA/fileA | GENERATION 2 |
| .. | .. | .. |

Fig. 18

APPLICATION MANAGEMENT TABLE 5300

| ADDRESS 5301 | APPLICATION TYPE 5302 | ASSOCIATED CHARACTER STRING 5303 |
|---|---|---|
| 192.168.1.2 | NAS | "NAS" |
| 192.168.1.3 | MAIL | "Mail" |
| 192.168.1.4 | COLLABORATION | "Collaboration" |
| : | : | : |

Fig. 32

SEARCH INDEX IN-PROCESS DATA MANAGEMENT TABLE FOR MAIL 8300

| CONTENT IDENTIFICATION INFORMATION 8301 | | STORAGE POSITION INFORMATION 8302 | | METADATA 8303 | | KEYWORD 8304 |
|---|---|---|---|---|---|---|
| ACCOUNT INFORMATION | MAIL ID | OFFSET | DATA LENGTH | UPDATE TIME | ACCESS CONTROL INFORMATION | |
| UserA | Mail1 | 0 | 4096 | | | word1, word2 |
| UserA | Mail2 | 4096 | 4096 | | | word1, word3 |
| .. | .. | .. | .. | .. | .. | .. |

SEARCH INDEX IN-PROCESS DATA MANAGEMENT TABLE FOR COLLABORATION (8400)

| CONTENT IDENTIFICATION INFORMATION (8401) | | STORAGE POSITION INFORMATION (8402) | | METADATA (8403) | | KEYWORD (8404) |
|---|---|---|---|---|---|---|
| PROJECT INFORMATION | FILE PATH | OFFSET | DATA LENGTH | UPDATE TIME | ACCESS CONTROL INFORMATION | |
| ProjectA | /dirA/fileA | 0 | 4096 | | | word1, word2 |
| ProjectA | /dirA/fileB | 4096 | 4096 | | | word1, word3 |
| .. | .. | .. | .. | .. | .. | .. |

8401a, 8401b — 8402a, 8402b — 8403a, 8403b

INFORMATION APPARATUS

TECHNICAL FIELD

The present invention relates to an information apparatus.

BACKGROUND ART

Nowadays, various entities such as enterprises, public offices, and schools utilize various application programs. For example, various activities such as transmitting/receiving e-mail, creating a document, processing a workflow, and implementing a project are carried out by using application programs.

Generally, contents created by utilizing the application programs are stored and saved in files in formats which are different among application programs. Accordingly, for viewing, editing or the like of the contents created by the application programs, dedicated client programs respectively compatible with the application programs need to be installed on a terminal.

Hence, various techniques have been developed to enable a unified way of accessing a plurality of files in different formats created by the application programs (for example, see Patent Literature (PTL) 1).

CITATION LIST

Patent Literature

PTL 1: Japanese Patent Application Laid-open Publication No. 2009-116414

SUMMARY OF INVENTION

Technical Problem

However, in order to enable a unified way of accessing files created by various application programs running on an information processing system as disclosed in, for example, PTL 1, it is necessary to use a conversion program supporting the application programs. Furthermore, the more the number of application programs running on the information processing system increase, the more the size of the conversion program grows, thus complicating development and implementation of the conversion program.

The present invention has been made in view of such a background. An object of the invention is to provide an information apparatus which enables a unified way of accessing contents created by application programs configured to store the contents in files in different formats, without using a conversion program.

Solution to Problem

One means for solving the above problem is an information apparatus in an information apparatus in an information processing system, the information processing system including a first storage apparatus having a first storage medium, a second storage apparatus having a second storage medium, a first server communicatively coupled to the first storage apparatus, storing a content in a file in a first format, and executing a first application program storing the file in the first storage medium, a second server communicatively coupled to the first storage apparatus, storing a content in a file in a second format different from the first format, and executing a second application program storing the file in the first storage medium, the information apparatus communicatively coupled to the first server, the second server, and the second storage apparatus, acquiring a replica of a content in each file stored in the first storage medium to store in the second storage medium, and a client communicatively coupled to the information apparatus, transmitting a read request for a content to the information apparatus, and receiving from the information apparatus the content for which the read request is made, the information apparatus comprising: a first request transmitter transmitting, to the first server, a transmission request for the content in the file generated by the first application program; a first content receiver receiving in response to the transmission request, from the first server, the content read from the first storage medium by the first application program; a first content replicator storing, in the second storage medium, the content received by the first content receiver; a second request transmitter transmitting, to the second server, a transmission request for the content in the file generated by the second application program; a second content receiver receiving, in response to the transmission request, from the second server the content read from the first storage medium by the second application program; a second content replicator storing in the second storage medium the content received by the second content receiver; a global identifier generator generating a global identifier allowing the client to uniquely identify each content stored in the second storage medium; a global identifier storage storing, in a global identifier management table, storage position information indicating a storage position of each content in the second storage medium and the global identifier of the content in association with each other; and a read processor receiving from the client the read request for the content whose global identifier is specified, reads the content from the storage position identified based on the storage position information stored in the global identifier management table in association with the global identifier to transmit to the client.

The other problems and solutions thereto disclosed in the present application will be made clear by the descriptions in the section of Description of Embodiments, the descriptions in the drawings, and the like.

Advantageous Effects of Invention

According to the present invention, a unified way of accessing files created by application programs storing contents in files in different formats, without using a conversion program is made possible.

BRIEF DESCRIPTION OF DRAWINGS

FIG. 13 is a diagram showing a backup catalog information management table according to an embodiment.

FIG. 14 is a diagram showing a backup catalog information management table according to an embodiment.

FIG. 15 is a diagram showing a backup catalog information management table according to an embodiment.

FIG. 16 is a diagram showing an aggregation data management table according to an embodiment.

FIG. 17 is a diagram showing an alias management table according to an embodiment.

FIG. 18 is a diagram showing an application management table according to an embodiment.

FIG. 32 is a diagram showing a search index in-process data management table according to an embodiment.

FIG. 33 is a diagram showing a search index in-process data management table according to an embodiment.

DESCRIPTION OF EMBODIMENTS

Figure 1:
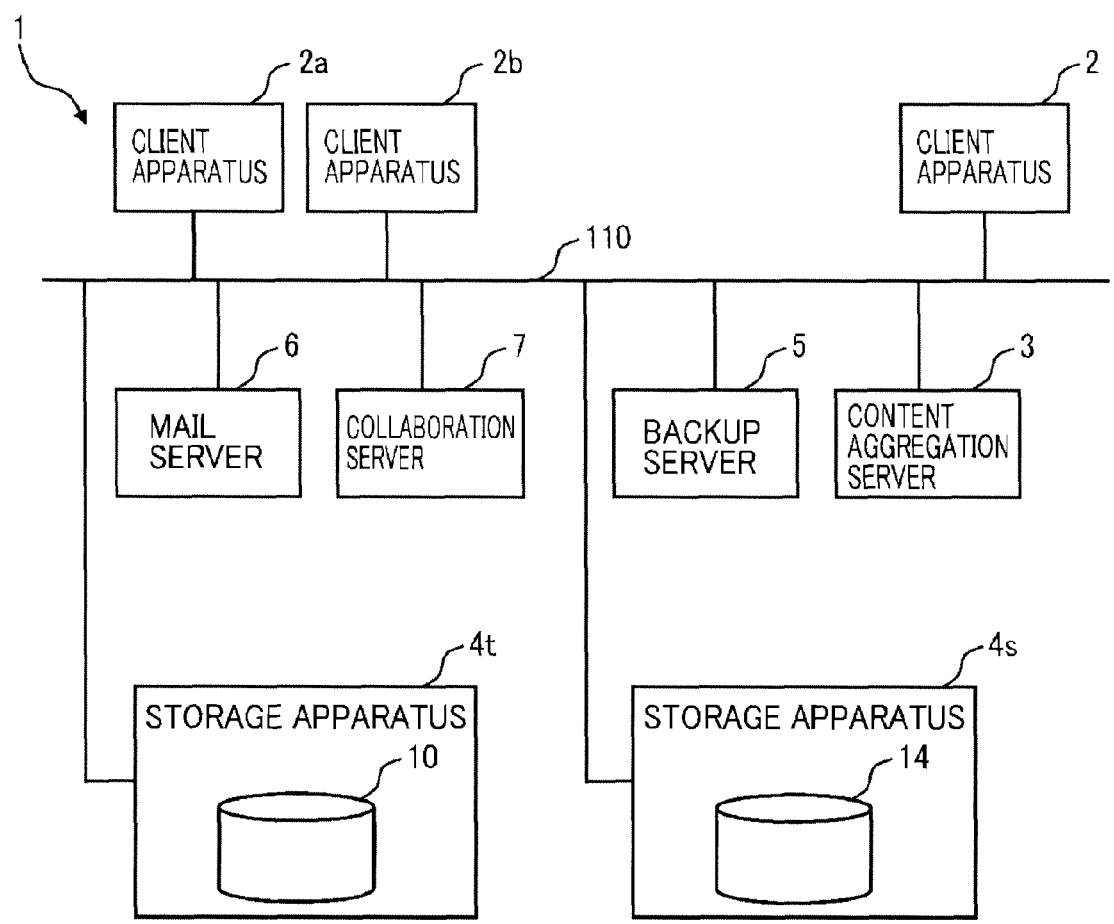
FIG. 1 is a diagram showing an overall configuration of an information processing system according to an embodiment.

Hereinbelow, description will be given of the embodiments of the present invention with reference to the drawings. It should be noted that identical portions are basically denoted by identical reference characters in the drawings for illustrating the embodiments, and repeated descriptions thereof will be omitted. In addition, when a program or a function serves as a subject in a sentence in the descriptions, it is actually a processor or a circuit executing the program that implements the processes.

First Embodiment

Description will be given of an information processing system of a first embodiment with reference to FIGS. 1 to 26.

FIG. 1 shows an information processing system 1 in the first embodiment.

The information processing system 1 is configured with a client apparatus 2, a client apparatus 2a, a client apparatus 2b, a content aggregation server 3, a backup server 5, a mail server 6, a collaboration server 7, a storage apparatus 4s, and a storage apparatus 4t, all of which are communicatively coupled to each other through a network 110. Note that the backup server 5 and the content aggregation server 3 correspond to an information apparatus described in the Claims.

The client apparatus 2a is a computer used by employees or the like (hereinafter, also referred to as users) of enterprise A who carry out work while utilizing various information processing functions provided by the information processing system 1. The client apparatus 2b is a computer used by users of enterprise B who carry out work while utilizing various information processing functions provided by the information processing system 1.

The client apparatuses 2a, 2b are communicatively coupled to the mail server 6 and the collaboration server 7, the mail server 6 controlling transmission/reception of e-mail, the collaboration server 7 performing control for enabling the users to share a document, schedule information or the like. In addition, the client apparatuses 2a, 2b are communicatively coupled to the storage apparatus 4t. The users of the client apparatuses 2a, 2b can store in and also read from the storage apparatus 4t a file by utilizing memory resources provided by the storage apparatus 4t.

Note that the mail server 6, the collaboration server 7, the storage apparatus 4t, and the network 110 are shared among the users of Enterprise A and the users of Enterprise B, but control is performed to isolate information of the users of the enterprises from each other.

The mail server 6 is a computer for controlling transmission/reception of e-mail performed among the users. A mail server program (corresponding to an application program described in the Claims) is installed on the mail server 6. The mail server 6 provides functions such as e-mail reception, transmission, and search for the client apparatuses 2a, 2b installed with a mail client program.

In addition, in order to provide the e-mail function for the client apparatuses 2a, 2b, the mail server 6 stores various files in the storage apparatus 4t in a format in accordance with standards with which the mail server program complies, the files being such as those storing contents of e-mails (hereinafter, also referred to as mail data) transmitted/received among the users.

The collaboration server 7 is a computer for controlling document sharing among the users, project management, schedule information sharing, and the like. A collaboration server program (corresponding to an application program described in the Claims) is installed on the collaboration server 7. The collaboration server 7 provides the client apparatuses 2a, 2b installed with the collaboration client program with functions of storing, sharing and the like of a file or the like, such as an office document, in which contents created by the collaboration server program (hereinafter, also referred to as collaboration data) are stored.

In addition, in order to provide the function of document management or the like for the client apparatuses 2a, 2b, the collaboration server 7 stores various files in the storage apparatus 4t in a format in accordance with standards with which the collaboration server program complies, the files being such as those storing contents of a document, schedule information or the like are stored.

The storage apparatuses 4t, 4s are each configured as a disk array apparatus in which a plurality of storage media such as hard disk drives are stored.

The client apparatus 2 is a computer used by an operator who performs maintenance, operation management, various analyses, and the like of the information processing system 1, such as backup of data stored in the storage media of the storage apparatus 4t and fault recovery of the information processing system 1.

The operator performs, for example, data mining by using the client apparatus 2. When data mining is performed, the client apparatus 2 collects data in various formats created by the various application programs and stored in the information processing system 1.

The backup server 5 is a computer which performs a backup process for storing, in the storage apparatus 4s, replicas of data stored in the storage apparatus 4t.

Although description will be given in detail later, for example, when backing up e-mail data stored in the storage apparatus 4t to the storage apparatus 4s, the backup server 5 transmits to the mail server 6 a transmission request for e-mail data in the file generated by the mail server program. Then, the backup server 5 receives from the mail server 6 the e-mail data read by the mail server program from the storage medium of the storage apparatus 4t. Thereafter, the backup server 5 stores the received e-mail data in the storage medium of the storage apparatus 4s.

Likewise, for example, when backing up a content in the collaboration data stored in the storage apparatus 4t to the storage apparatus 4s, the backup server 5 transmits to the collaboration server 7 a transmission request for the content in the collaboration data generated by the collaboration server program. Then, the backup server 5 receives from the collaboration server 7 the content read by the collaboration server program from the storage medium of the storage apparatus 4t. Thereafter, the backup server 5 stores the received content in the storage medium of the storage apparatus 4s.

The content aggregation server 3 is a computer which has a function by which contents, created by the various application programs and stored in the storage apparatus 4s, are aggregated and then provided for the client apparatus 2.

In general, since the contents created by the application programs are respectively stored in files in formats in compliance with the respective application programs, the contents in the files cannot be read or searched for in a unified manner without conversion. However, the backup server 5 and the content aggregation server 3 according to the present embodiment assign the contents such identifiers (hereinafter, also described as global identifiers) with which the contents in the files stored in the storage apparatus 4s can be uniquely identified, and thereby the client apparatus 2 can access the contents created by the application programs in a unified manner.

This eliminates the need for the client apparatus 2 to understand protocols specific to the individual application programs and facilitates the implementation of a content management system which achieves a single name space.

In addition, when the client apparatus 2 accesses the contents, there will be no need for a process such as understanding a protocol depending on the application program or converting a format, and thus the client apparatus 2 accesses the contents through only an access reply program. Accordingly, an access overhead is reduced, and the access performance is enhanced.

In an aggregation data management table (corresponding to a global identifier management table described in the Claims) 3500 to be described in detail later, the content aggregation server 3 has stored therein the aforementioned global identifiers assigned to the contents and storage position information indicating storage positions of the respective contents in the storage media in the storage apparatus 4s.

When receiving from the client apparatus 2 a request to access a content whose global identifier is specified, the content aggregation server 3 reads the content based on an address which is stored in the aggregation data management table 3500 in association with the specified global identifier and then transmits the content to the client apparatus 2.

The network 110 is a communication path configured by any of, for example, various LANs (Local Area Network), WANs (Wide Area Network), and the like.

Note that the mail server program and the collaboration server program described in the present embodiment are only a few examples of the application programs, and the present embodiment is not limited to these application programs. For example, an HTTP (HyperText Transfer Protocol) server, a relational database management system (RDBMS) and the like can be cited as other application programs.

Meanwhile, the mail server 6 and the collaboration server 7 (corresponding to a first server and a second server described in the Claims) are sometimes collectively referred to as an application server apparatus. In addition, the content aggregation server 3, the backup server 5, the mail server 6, and the collaboration server 7 are sometimes collectively referred to as a server apparatus. Furthermore, the storage apparatuses 4s and 4t are sometimes collectively referred to as a storage apparatus 4.

Figure 2:
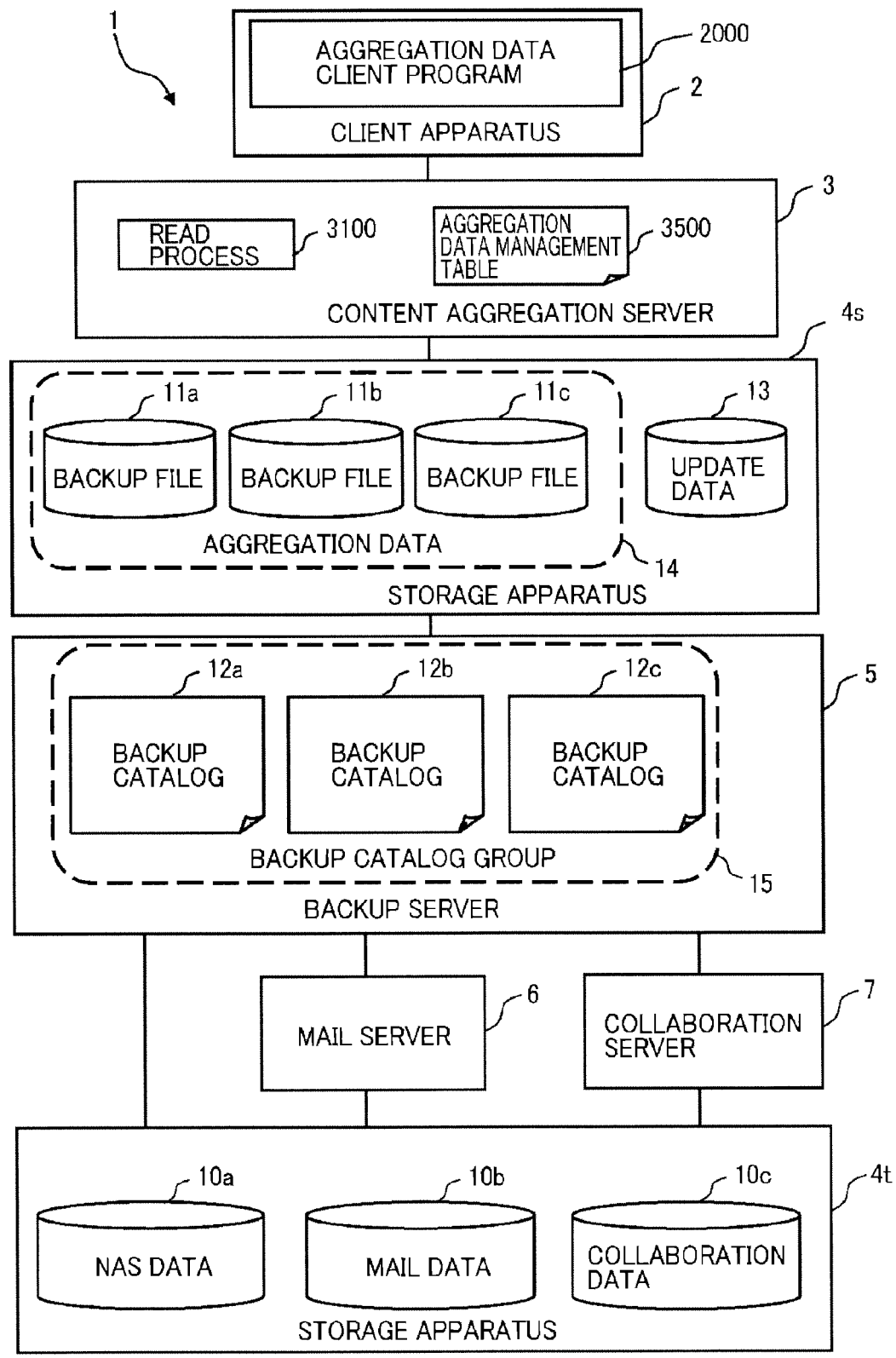
FIG. 2 is a diagram showing an overall configuration of the information processing system according to an embodiment.

FIG. 2 is a diagram showing some programs, processes, tables, data and the like which are related to the information processing system 1 according to the present embodiment.

Application data 10 such as NAS (Network Attached Storage) data 10a, mail data 10b, and collaboration data 10c are stored in the storage apparatus 4t.

The NAS data 10a is an aggregate body of files managed by the storage apparatus 4t. The NAS data 10a is accessed by the client apparatuses 2a, 2b through a file sharing protocol such as an NFS (Network File System) protocol or a CIFS (Common Interface File System) protocol.

The mail data 10b is an aggregate body of mails (messages) managed by the mail server program. The collaboration data 10c is an aggregate body of documents and data managed by the collaboration program.

Files, mails (messages), documents and data included in the NAS data 10a, the mail data 10b, and the collaboration data 10c are collectively referred to as contents. The contents are managed by applications.

The client apparatus 2 executes an aggregation data client program 2000. According to the aggregation data client program 2000: (1) a read request is issued to the content aggregation server 3 and thereby a content managed by the content aggregation server 3 is read; (2) a write request is issued to the content aggregation server 3 and thereby a content is written to the content aggregation server 3; (3) a delete request is issued to the content aggregation server 3 and thereby a content managed by the content aggregation server 3 is deleted; and (4) a search request is issued to the content aggregation server 3 and thereby a content managed by the content aggregation server 3 is searched for.

The content aggregation server 3 executes various programs to implement processes such as read process 3100. Note that the read process 3100 is illustrated as a typical process, but the content aggregation server 3 implements various processes (such as a write process, a delete process, and a search process) in addition thereto. Besides, the content aggregation server 3 stores the aggregation data management table 3500 to be described later.

The storage apparatus 4s stores therein aggregation data 14 and update data 13. The aggregation data 14 is an aggregate body of backup files 11.

A backup file 11a is a file including replicas of contents in the NAS data 10a stored in the storage apparatus 4t. A backup file 11b is a file including replicas of contents in the mail data 10b stored in the storage apparatus 4t. A backup file 11c is a file including replicas of contents in the collaboration data 10c stored in the storage apparatus 4t.

The update data 13 is a file including a content transmitted together with a write request (an update request) transmitted from the client apparatus 2.

The backup server 5 stores a backup catalog group (corresponding to a replica management table described in the claims 15. The backup catalog group 15 is an aggregate body of backup catalogs 12a, 12b, and 12c.

The backup catalog 12a is a table which is created by the backup server 5 when the contents in the NAS data 10a stored in the storage apparatus 4t are backed up to the storage apparatus 4s by the backup server 5.

The backup catalog 12b is a table which is created by the backup server 5 when the contents in the mail data 10b stored in the storage apparatus 4t are backed up to the storage apparatus 4s by the backup server 5.

The backup catalog 12c is a table which is created by the backup server 5 when the contents in the collaboration data 10c stored in the storage apparatus 4t are backed up to the storage apparatus 4s by the backup server 5.

Figure 3:
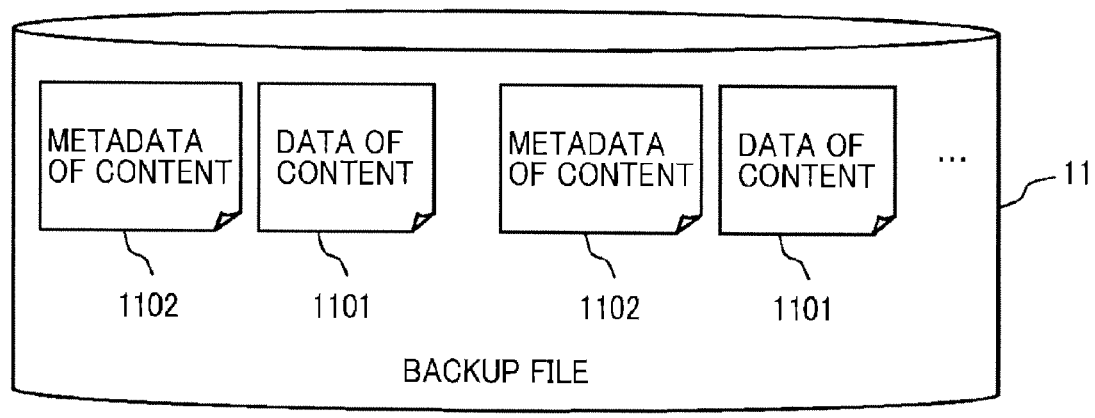
FIG. 3 is a diagram showing a backup file according to an embodiment.

FIG. 3 shows a conceptual diagram of a data structure of the backup file 11. The backup file 11 is a file in which replicas of the contents (sometimes referred to simply as contents) included in the application data 10 are stored.

The backup file 11 can be stored in a file system created on a volume (a logical storage area configured by storage areas provided by one or a plurality of storage media such as HDDs (Hard Disk Drives)) in the storage apparatus 4s.

As shown in FIG. 3, the backup file 11 includes at least data 1101 of a content. The backup file 11 can also be made to include metadata 1102 of the content in addition to data 1101 of the content. The metadata 1102 of the content can be configured to include the time of creation, the time of update, size, and the like of the content.

Figure 4:
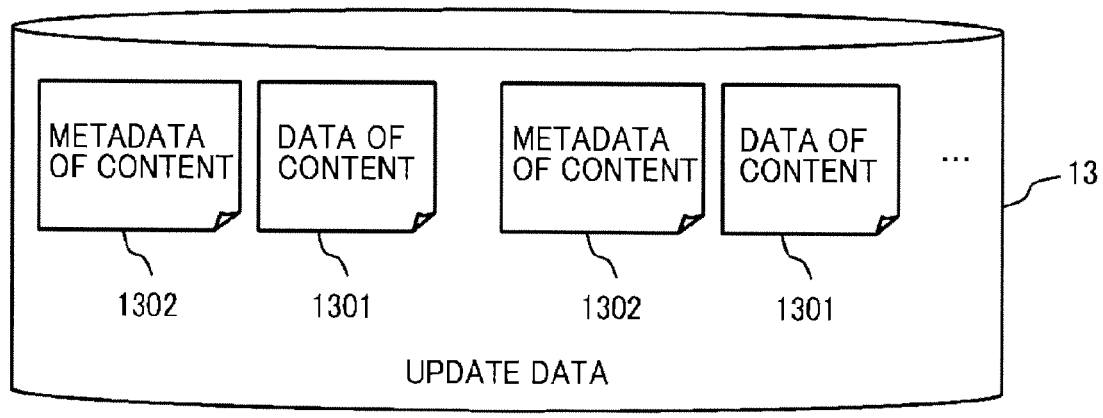
FIG. 4 is a diagram showing update data according to an embodiment.

FIG. 4 shows a conceptual diagram of a data configuration of update data 13. Write data (an updated content) received from the client apparatus 2 in write process 3200, described later, is written to the update data 13. The update data 13 can be stored in the file system created on the volume in the storage apparatus 4s.

As shown in FIG. 4, the update data 13 includes at least data 1301 of a content. The update data 13 can also be designed to include metadata 1302 of the content in addition to data 1301 of the content. The metadata 1302 of the content can be designed to include the time of creation, the time of update, size, and the like of the content.

The backup catalogs 12 store therein content identification information, storage position information (storage position information indicating a storage position in one of the storage media in the storage apparatus 4s), metadata, and the like of the contents stored in the backup file 11. The backup catalogs 12a, 12b and 12c are respectively configured by backup catalog information management tables 5400, 5500, and 5600 for NAS, mail, and collaboration, respectively, which will be described later.

The aggregation data management table 3500 stores therein global content identification information (a global identifier) which can uniquely identify a content in all the backup files 11 included in the aggregation data 14, content storage position information (storage position information indicating a storage position in one of the storage media in the storage apparatus 4s), and the like.

By using the aggregation data management table 3500, the content aggregation server 3 can identify the storage position of data of a content corresponding to global content identification information specified by the client apparatus 2 and then transmit the data of the identified content to the client apparatus 2.

Figure 5:
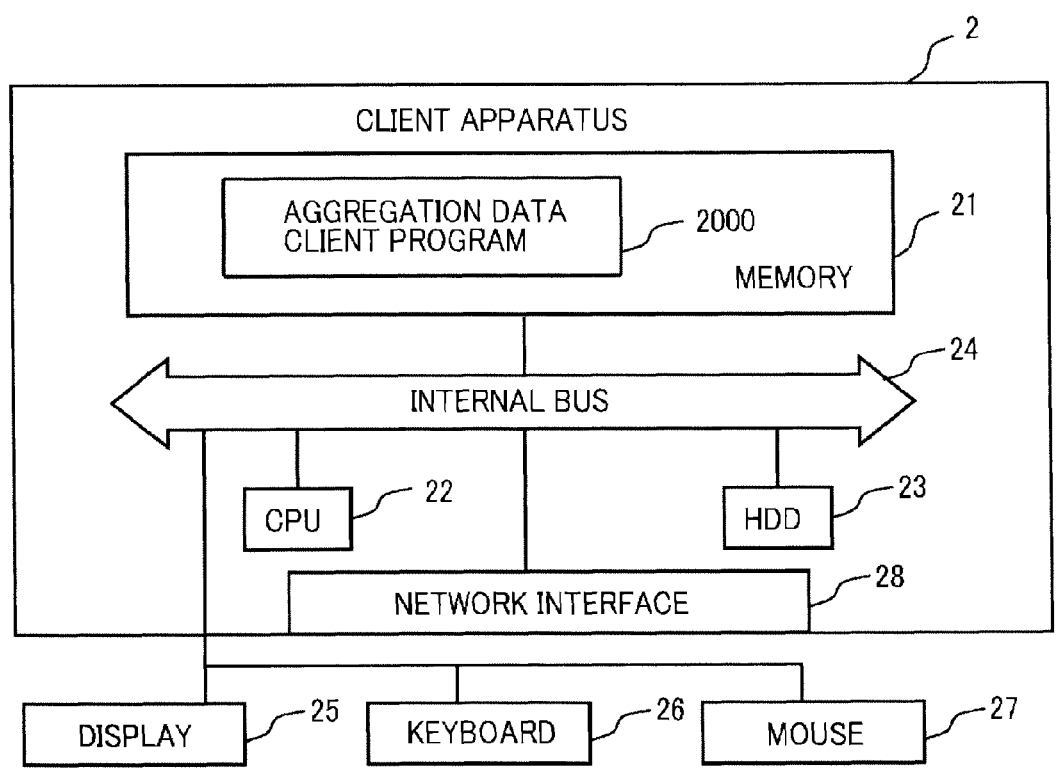
FIG. 5 is a diagram showing a configuration of a client apparatus according to an embodiment.

FIG. 5 shows a hardware configuration diagram of the client apparatus 2. The client apparatus 2 has a CPU (Central Processing Unit) 22, a memory 21, an HDD (Hard Disk Drive) 23, and a network interface 28, as internal components, which are coupled to each other through an internal bus 24. Furthermore, a display 25, a keyboard 26, and a mouse 27 are coupled as user interfaces to the client apparatus 2.

The client apparatus 2 is coupled to the network 110 via the network interface 28 and communicates with the content aggregation server 3. It is possible to utilize, for example, Ethernet (registered trademark) as the network 110 and TCP/IP (Transmission Protocol/Internet Protocol) as a communication protocol.

The memory 21 stores the aggregation data client program 2000 therein. The client apparatus 2 executes the program to make various processing requests such as a read request, a write request, a delete request, a search request, and the like which are made for a content to the content aggregation server 3. The program stored in the memory 21 is read to and executed by the CPU 22.

Figure 6:
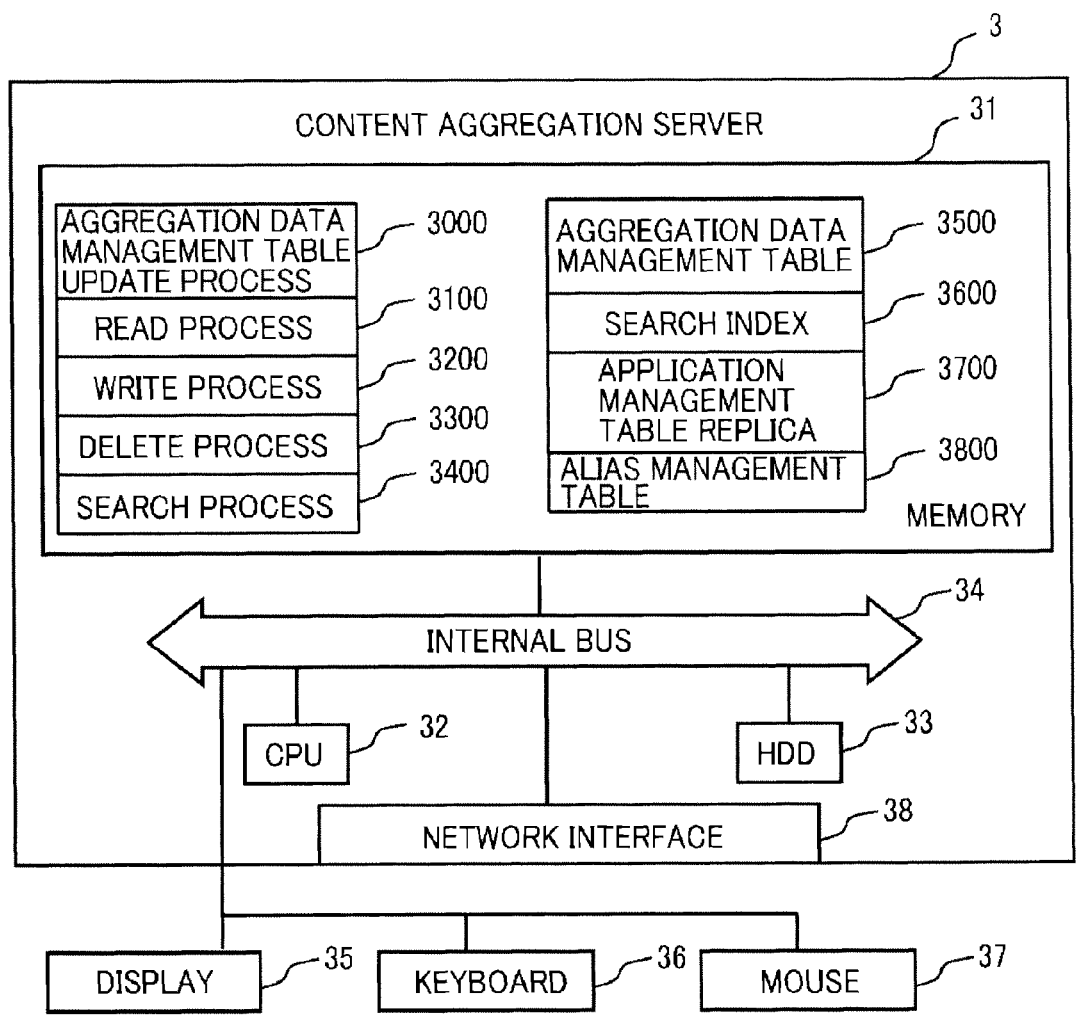
FIG. 6 is a diagram showing a configuration of a content aggregation server according to an embodiment.

FIG. 6 shows a hardware configuration diagram of the content aggregation server 3.

The content aggregation server 3 has a CPU (Central Processing Unit) 32, a memory 31, an HDD (Hard Disk Drive) 33, and a network interface 38, as internal components, which are coupled to each other through an internal bus 34. Furthermore, a display 35, a keyboard 36, and a mouse 37 are coupled as user interfaces to the content aggregation server 3.

The memory 31 of the content aggregation server 3 stores: various programs for performing processes such as aggregation data management table update process 3000, read process 3100, write process 3200, delete process 3300, and search process 3400; and various tables such as aggregation data management table 3500, search index 3600, application management table replica 3700, and alias management table 3800. The programs stored in the memory 31 of the content aggregation server 3 are read to and executed by the CPU 32.

The search index 3600 is a table in which words and global content identification information of a content including description of the words are stored in the following manner. Words are extracted from the contents stored in the storage media in the storage apparatus 4s, and each of the extracted words is associated with global content identification information of the content including description of the extracted word.

The application management table replica 3700 is a table which stores: IP addresses of the server apparatuses executing the application programs; and identification information on the application programs in association with each other. Description will be given in detail later.

The alias management table 3800 is a table which has recorded therein identification information (an alias) uniquely assigned to each generation of the contents stored in the storage apparatus 4s.

A generation is information given in accordance with the number of times a replica of a content stored in the storage apparatus 4t has been backed up to the storage apparatus 4s.

The alias management table 3800 stores global content identification information of contents, generation information of the contents, and aliases given to the contents of the same generation, in association with each other.

The content aggregation server 3 is coupled to the network 110 through the network interface 38 and communicates with the client apparatus 2 and the storage apparatus 4s.

Figure 7:
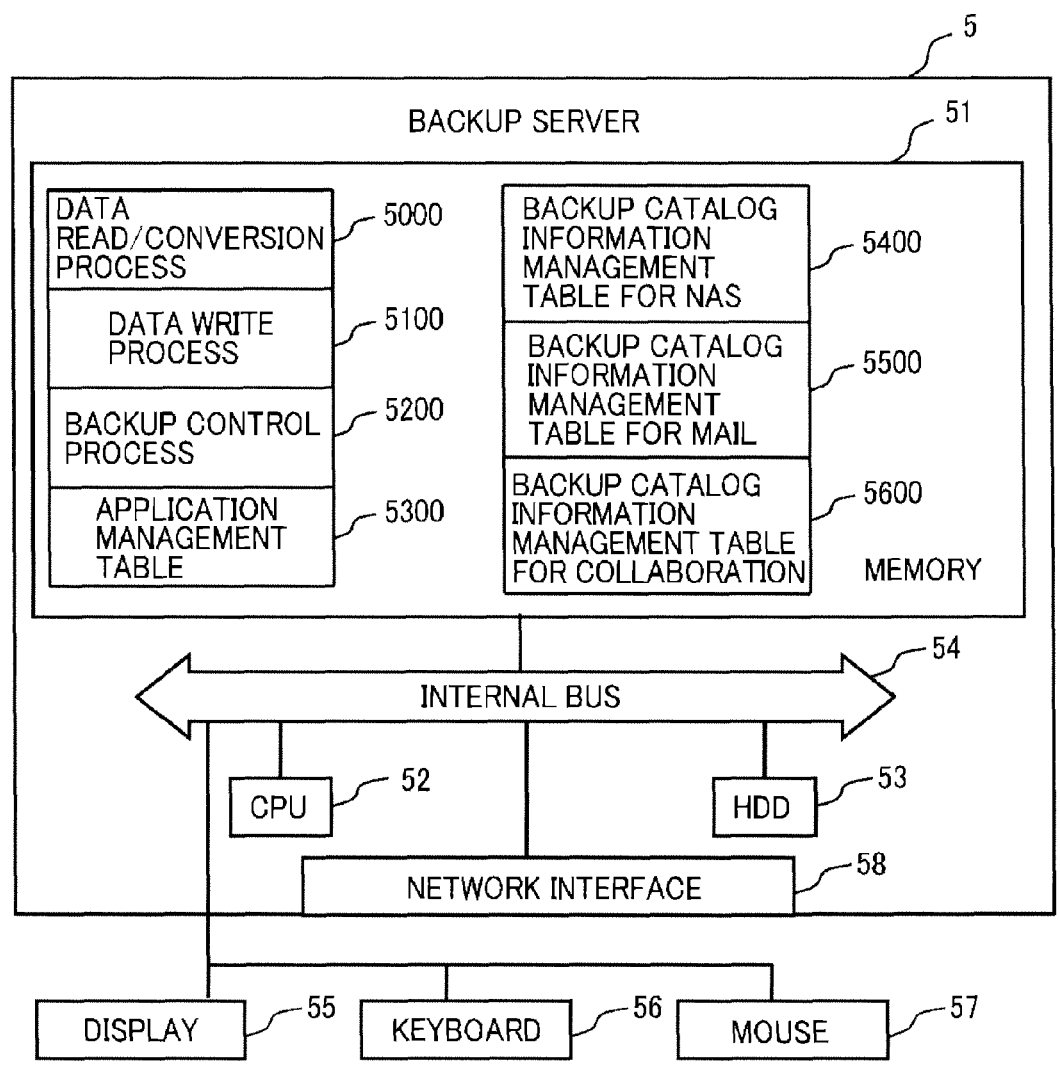
FIG. 7 is a diagram showing a configuration of a backup server according to an embodiment.

FIG. 7 shows a hardware configuration of the backup server 5.

The backup server 5 has a CPU 52, a memory 51, an HDD 53, and a network interface 58, as internal components, which are coupled to each other through an internal bus 54. Furthermore, a display 55, a keyboard 56, and a mouse 57 are coupled as user interfaces to the backup server 5.

The memory 51 of the backup server 5 stores: various programs for performing processes such as data read and conversion process 5000, a data write process 5100, and a backup control process 5200; and tables such as backup catalog information management tables 5400, 5500, and 5600 for NAS, mail, and collaboration, respectively. The programs stored in the memory 51 of the backup server 5 are read to and executed by the CPU 52.

The backup server 5 is coupled to the network 110 through the network interface 58 and communicates with the storage apparatus 4s, the mail server 6, the collaboration server 7, and the storage apparatus 4t.

Figure 8:
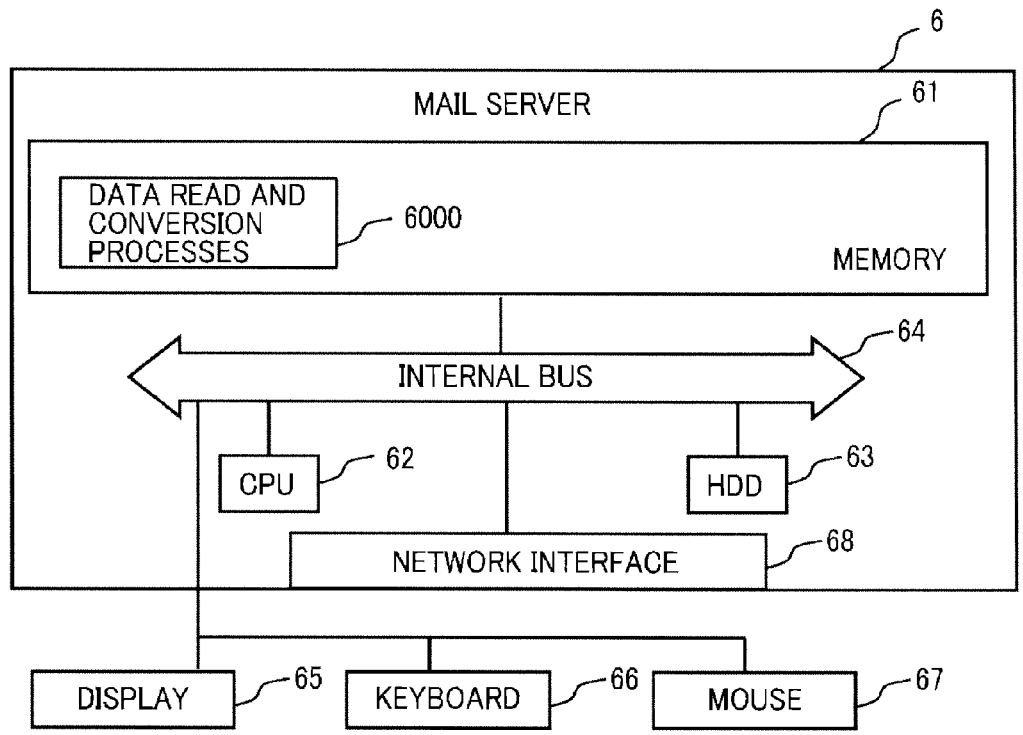
FIG. 8 is a diagram showing a configuration of a mail server according to an embodiment.

FIG. 8 shows a hardware configuration of the mail server 6. The mail server 6 has a CPU 62, a memory 61, an HDD 63, and a network interface 68, as internal components, which are coupled to each other through an internal bus 64. Furthermore, a display 65, a keyboard 66, and a mouse 67 are coupled as user interfaces to the mail server 6.

The memory 61 of the mail server 6 stores various programs for performing processes such as data read and conversion process 6000. The programs stored in the memory 61 are read to and executed by the CPU 62.

The mail server 6 is coupled to the network 110 through the network interface 68 and communicates with the backup server 5 and the storage apparatus 4t.

Figure 9:
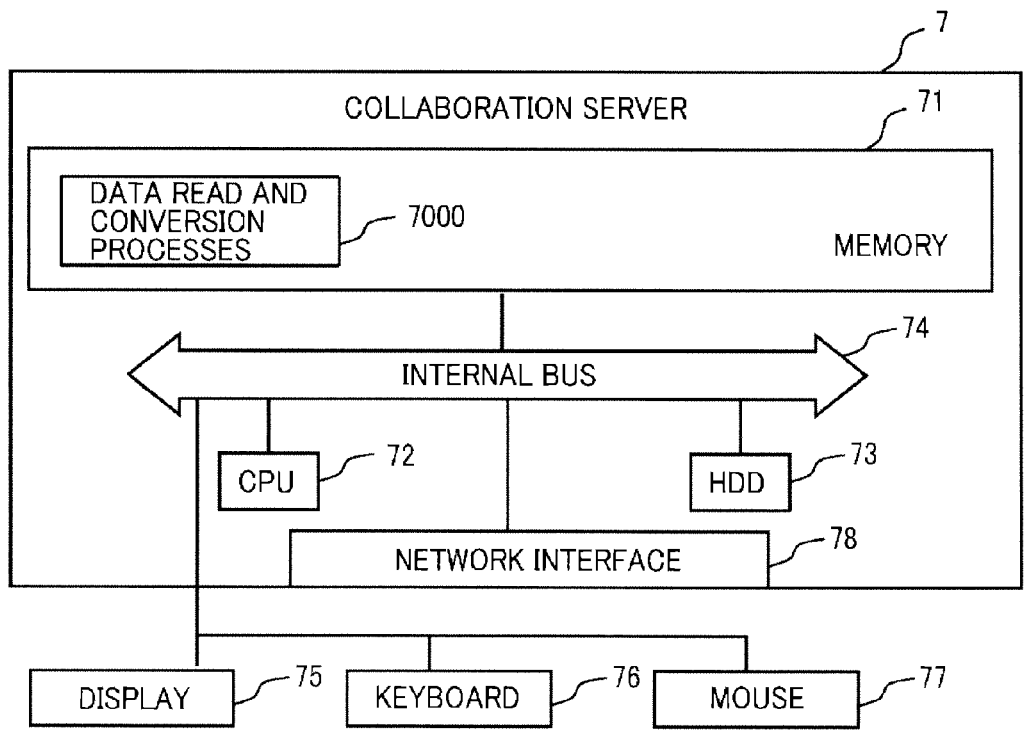
FIG. 9 is a diagram showing a configuration of a collaboration server according to an embodiment.

FIG. 9 shows a hardware configuration of the collaboration server 7.

The collaboration server 7 has a CPU 72, a memory 71, an HDD 73, and a network interface 78, as internal components, which are coupled to each other through an internal bus 74. Furthermore, a display 75, a keyboard 76, and a mouse 77 are coupled as user interfaces to the collaboration server 7.

The memory 71 of the collaboration server 7 stores: various programs for performing processes such as data read and conversion process 7000. The programs stored in the memory 71 of the collaboration server 7 are read to and executed by the CPU 72 of the collaboration server 7.

The collaboration server 7 is coupled to the network 110 through the network interface 78 and communicates with the backup server 5 and the storage apparatus 4t.

Figure 10:
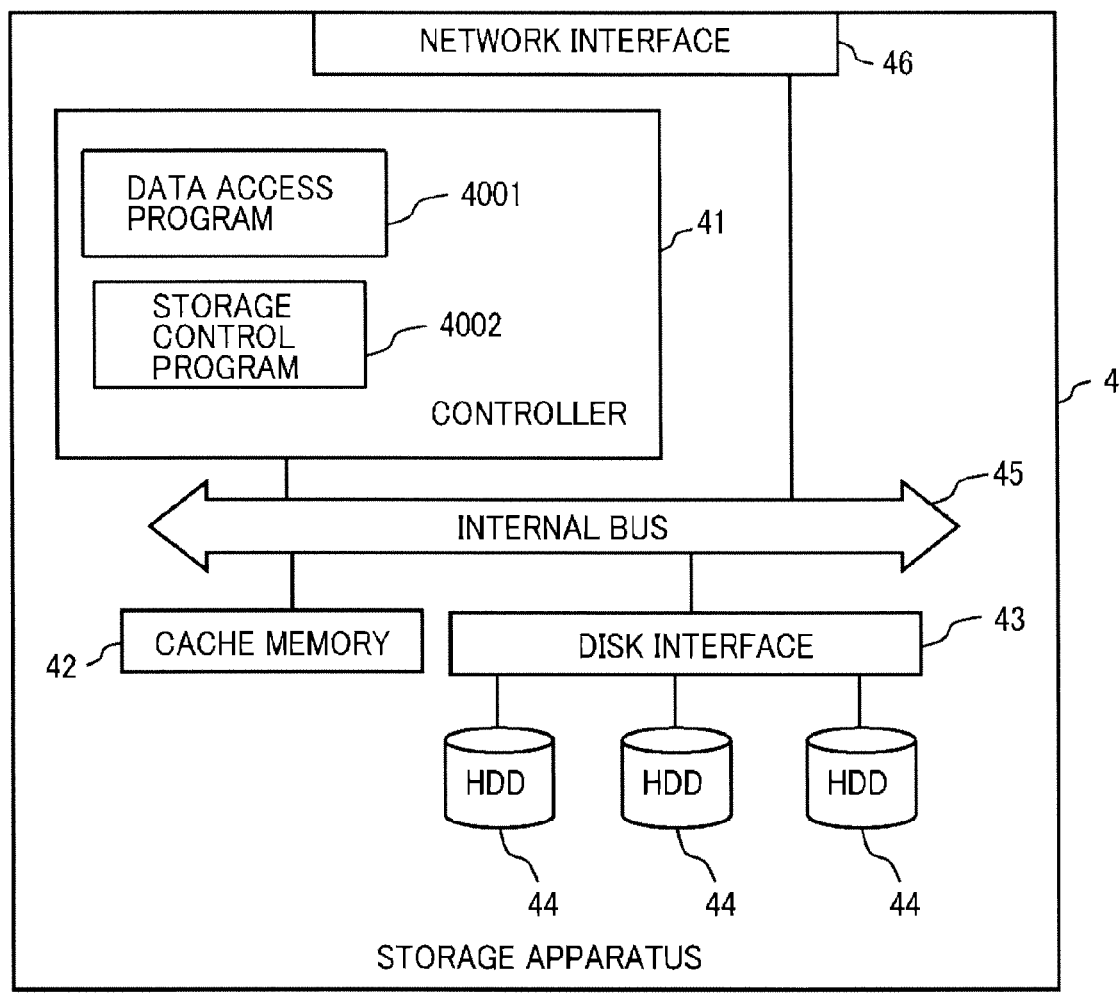
FIG. 10 is a diagram showing a configuration of a storage apparatus according to an embodiment.

FIG. 10 shows a hardware configuration of the storage apparatus 4. The storage apparatus 4 is a generic term for the storage apparatuses 4s and 4t.

The storage apparatus 4 includes a network interface 46, a controller 41, a cache memory 42, a disk interface 43, and HDDs 44, which are coupled to each other through an internal bus 45, except for the HDDs 44. The HDDs 44 are coupled to the disk interface 43.

The storage apparatus 4s is coupled to the network 110 through the network interface 46 of the storage apparatus 4s and communicates with the content aggregation server 3 and the backup server 5.

The storage apparatus 4t is coupled to the network 110 through the network interface 46 of the storage apparatus 4t and communicates with the client apparatuses 2a, 2b, the backup server 5, the mail server 6, and the collaboration server 7.

The HDDs 44 of the storage apparatus 4s store the backup files 11 and the update data 13. The HDDs 44 of the storage apparatus 4t store the NAS data 10a, the mail data 10b, and the collaboration data 10c.

An unillustrated memory of the controller 41 stores a data access program 4001 and a storage control program 4002. An unillustrated CPU of the controller 41 reads and executes the various programs stored in the memory.

The storage apparatus 4s stores the backup files 11 and the update data 13 in an unillustrated volume. The storage apparatus 4t stores the application data 10 (a generic term for the NAS data 10a, the mail data 10b, and the collaboration data 10c) in an unillustrated volume. Note that a volume is a logical storage area configured by storage areas of one or a plurality of HDDs 44.

The storage apparatus 4 executes the data access program 4001 and provides a data access function for the purpose of accessing data in the volume. For example, the storage apparatus 4 provides the server apparatus with a means of accessing data by using a protocol for data access such as SCSI (Small Computer System Interface) or NFS (Network File System).

In addition, the storage apparatus 4 executes the storage control program 4002 and provides the server apparatus with storage control functions for changing the configuration of the storage apparatus 4 and for acquiring a copy of a volume. The server apparatus executes an unillustrated storage control program and makes requests to the storage apparatus 4, such as a request for referring to or changing configuration information of the storage apparatus 4 and a request for creating a copy of a volume. The storage control function performs processes based on what is requested by the request.

Figure 11:
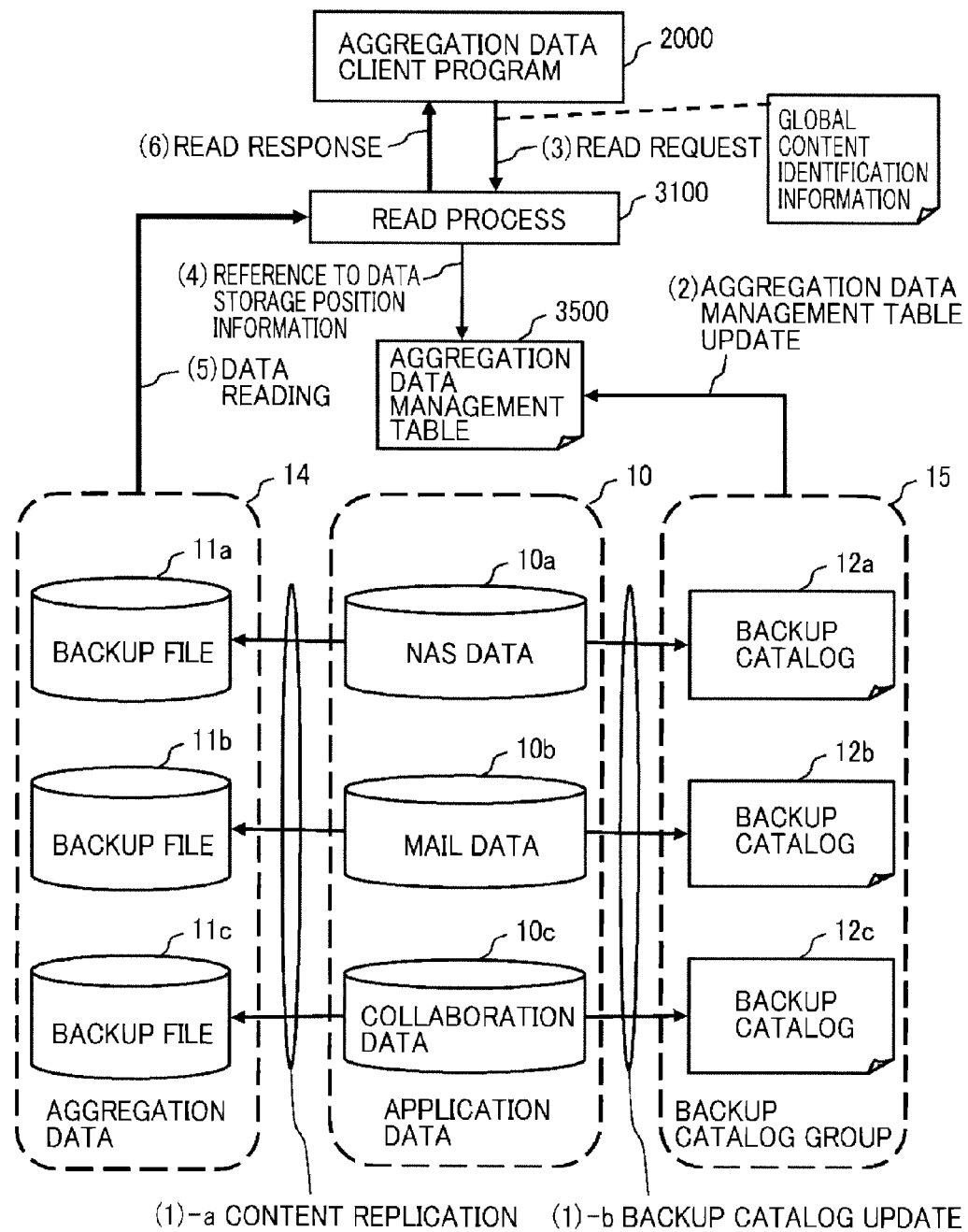
FIG. 11 is a diagram showing an outline of processes according to an embodiment.

FIG. 11 shows a conceptual diagram of the information processing system 1 in the first embodiment.

As shown in FIG. 11, the information processing system 1 includes the aggregation data client program 2000, the read process 3100, the aggregation data management table 3500, the aggregation data 14 (the aggregate body of the backup files 11), the application data 10 (the NAS data 10a, the mail data 10b, and the collaboration data 10c), and the backup catalog group 15 (the aggregate body of the backup catalogs 12a, 12b, and 12c).

Processes performed by the information processing system 1 in the first embodiment will be described by dividing the processes into the following three sections.

That is, the processes have three process sections of (a) backup, (b) aggregation data management table update, and (c) content access.

<(a) Backup>

The backup process is a process in which the backup server 5 stores, in the storage media of the storage apparatus 4s, the replicas of the contents in the files recorded in the storage media of the storage apparatus 4t.

In the backup process section, the backup server 5 stores the replicas of the contents included in the application data 10 (the NAS data 10a, the mail data 10b, and the collaboration data 10c), in the backup files 11 (corresponding to "(1)-a content replication" in FIG. 11) and accordingly updates those included in the backup catalogs 12a, 12b, and 12c (corresponding to "(1)-b backup catalog update" in FIG. 11).

The following describes a process outline of how the backup process section related to the NAS data 10a is performed. Firstly, the backup server 5 reads data (and metadata) of a content in the NAS data 10a and stores the data (and the metadata) in the backup file 11a. Next, the backup server 5 appends content identification information of the stored content, storage position information thereof, and the metadata thereof, in the backup catalog 12a.

In addition, the following describes a process outline of how the backup process section related to the mail data 10b is performed. Firstly, the mail server 6 reads data (and metadata) of a content in the mail data 10b and transmits the data (and metadata) to the backup server 5. Next, the backup server 5 stores the received data (and the metadata) of the content in the backup file 11b. Lastly, the backup server 5 appends content identification information and storage position information of the stored content, and the metadata thereof, in the backup catalog 12b.

The following describes a process outline of how the backup process section related to the collaboration data 10c is performed. Firstly, the collaboration server 7 reads data (and metadata) of a content in the collaboration data 10c and transmits the data (and the metadata) to the backup server 5. Next, the backup server 5 stores the received data (and the metadata) of the content in the backup file 11c. Lastly, the backup server 5 appends content identification information and storage position information of the stored content, and the metadata thereof, in the backup catalog 12c.

The process at the backup process section is performed for a plurality of contents. There exit two types: full backup and incremental backup. A difference therebetween lies in how the plurality of contents are selected. The full backup and the incremental backup correspond to the backup control process 5200 to be described later.

In the full backup, the process at the backup process section is performed on all the contests included in the application data 10.

In the incremental backup, the process at the backup process section is performed on only contents which were added and updated after a previous full backup or an incremental backup.

Concretely, every time the backup server 5 executes the backup process, the backup server 5 records the time at which the backup process was executed in an (unillustrated) backup management table. At the time of a new execution of the backup process, the backup server 5 compares the time the previous backup was executed with the update time of the contents stored in the storage media of the storage apparatus 4s, the update time being recorded in the contents. Thus, the backup server 5 performs the backup process on only the contents which were updated after the previously executed backup process.

By performing the incremental backup in this manner, only added or updated contents are replicated, and thus the time period required for the backup process can be shortened.

Note that when the incremental backup is performed, information on a deleted content is also recorded in the corresponding backup catalog.

<(b) Aggregation Data Management Table Update>

In the process section for the aggregation data management table update, the content aggregation server 3 adds new entries to the aggregation data management table 3500 based on entry information included in the backup catalogs 12 in the backup catalog group 15 (this is referred to as an entry addition process). This process corresponds to (2) aggregation data management table update in FIG. 11.

An entry to be added includes global content identification information, storage position information of a content, access control information, and the like. The global content identification information of each content is generated, for example, by connecting together, as a character string on a content basis, an application identifier according to the type of application (NAS, Mail or Collaboration) for the entry and content identification information included in the entry of the backup catalogs 12.

In the case of performing the backup process by the full backup method, the aforementioned entry addition process is performed on all the entries in the backup catalogs 12 in the backup catalog group 15.

In the case of performing the backup process by the incremental backup method, the aforementioned entry addition process is performed on entries added after a previous full backup or incremental backup, among the entries in the backup catalogs 12 in the backup catalog group 15. Since the process is performed on only minimum required entries in the case of the incremental backup, the processing time can be reduced.

Upon completion of the entry addition process, the content aggregation server 3 can identify storage position information of any content included in the backup file 11 in the aggregation data 14, by using the global content identification information of the corresponding entry of the aggregation data management table 3500.

A further detailed description will be given later of the process of the aggregation data management table update.

<(c) Content Access>

In the content access process section, firstly, the client apparatus 2 which executes the aggregation data client program 2000 transmits an access request for a content whose global content identification information is specified, to the content aggregation server 3. Then, in response to the access request, content aggregation server 3 accesses the content stored at a storage position identified by storage position information stored in the aggregation data management table 3500 in association with the global content identification information. The process corresponds to (3) Read request, (4) Reference to data storage position information, (5) Data reading, and (6) Read response in FIG. 11.

Concretely, the aggregation data client program 2000 firstly specifies the global content identification information and transmits a read request to the content aggregation server 3 ((3) Read request).

Next, the program for the read process 3100 refers to the aggregation data management table 3500 to identify storage position information corresponding to the specified global content identification information ((4) Reference to data storage position information).

Next, the program for the read process 3100 reads data of the content from the backup file 11 based on the identified storage position information ((5) data reading).

Then, the program for the read process 3100 transmits the read data to the aggregation data client program 2000 ((6) Read response).

Note that the concept of the embodiment has been explained in the description with FIG. 11 by taking the read process as an example, but processes other than the read process will be explained in detail in the descriptions on the flowcharts to be described later. In addition, although the aforementioned description on (6) Read response did not explicitly describe a communication protocol between the client apparatus 2 on which the aggregation data client program 2000 runs and the content aggregation server 3 on which the program for the read process 3100 runs, CIFS (Communication Internet File Protocol), NFS (Network File System), HTTP (Hypertext Transfer Protocol) and the like being file sharing protocols can be used as the communication protocol.

Figure 12:
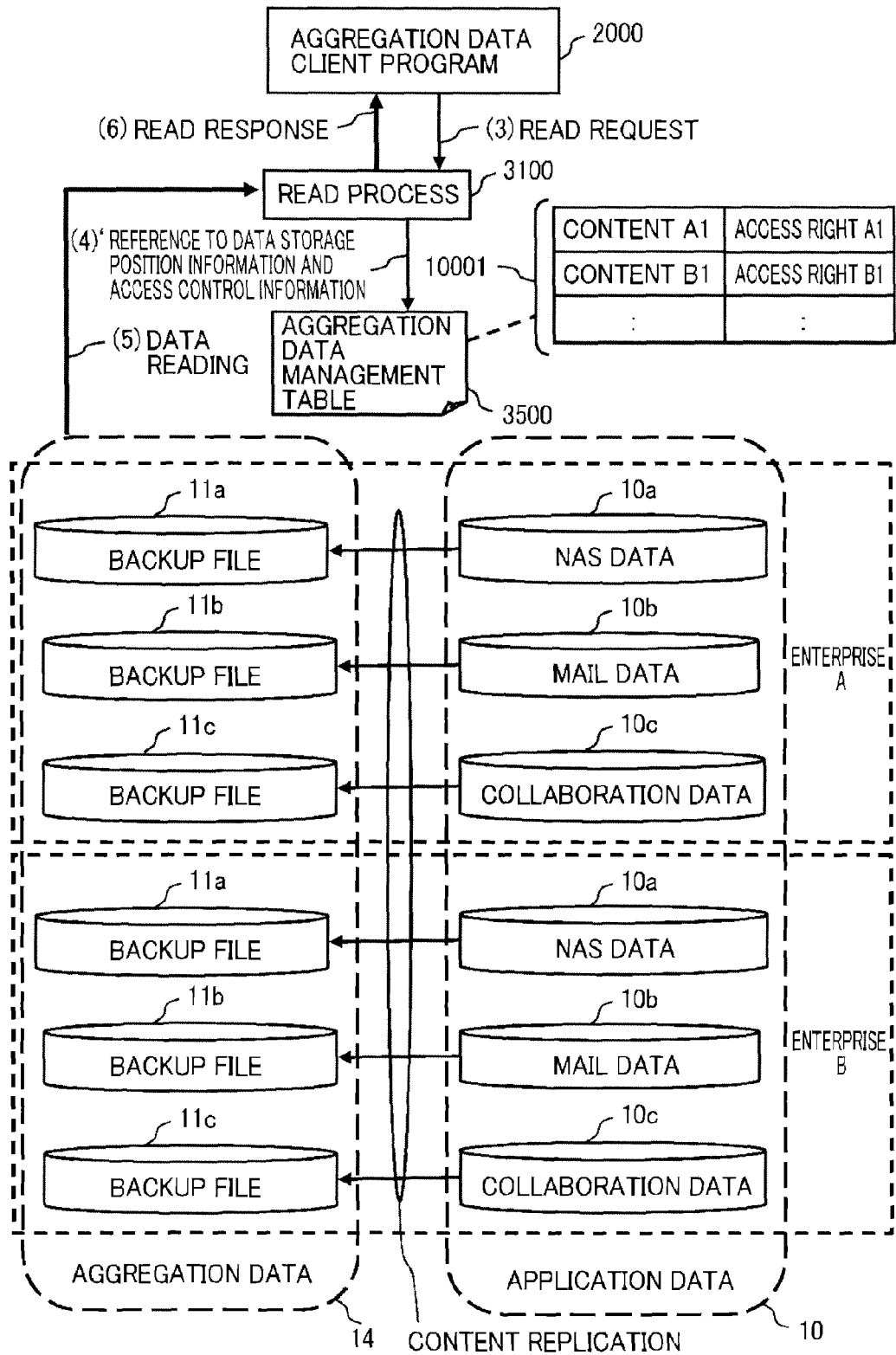
FIG. 12 is a diagram showing an outline of a process according to an embodiment.

FIG. 12 shows a conceptual diagram of access control in the first embodiment.

In the first place, the access control information will be described before the conceptual diagram of the access control is described. In accessing application data 10 such as the NAS data 10a, the mail data 10b, and the collaboration data 10c, access control is generally performed based on the access control information.

The access control makes it possible to allow only authorized users to access contents in the application data 10. The access control information is included in metadata of a content and registered in the aggregation data management table (corresponding to an access management table described in the claims 3500 in the aforementioned process of aggregation data management table update.

Next, the conceptual diagram of access control will be described. Processes in (3), (4)', (5), and (6) in FIG. 12 correspond to the processes (3), (4), (5), and (6) in the aforementioned process section of content access, respectively. In process (4)', a process below is performed instead of the aforementioned process (4). In other words, in addition to the process of identifying data storage position information, a process is performed in which access control information is referred to and thereby whether or not access can be permitted is judged.

Concrete examples will be described below. FIG. 12 shows a case where, application data 10 of enterprise A and enterprise B exist in the information processing system 1, aggregation data 14 of enterprise A and enterprise B are generated, and a certain user accesses the generated aggregation data 14 to read a content.

FIG. 12 also shows an example 10001 of the access control information. In this example, there exist an access right A1 permitting an access to a content A1 included in the aggregation data 14 of enterprise A and an access right B1 permitting an access to a content B1 included in the aggregation data 14 of enterprise B.

With process (4)', a user who has access right A1 but does not have access right B1 is permitted an access to content A1 but refused an access to content B1.

Next, a description is given of various tables in the first embodiment.

FIG. 13 shows a configuration example of the backup catalog information management table 5400 for NAS.

The backup catalog information management table 5400 for NAS is a table for storing information on contents included in the backup file 11a which is a backup file storing the replicas of the contents included in the NAS data 10a.

The backup catalog information management table 5400 for NAS is configured with content identification information 5401, generation information 5402, relation with previous generation 5403, storage position information 5404, and metadata 5405.

The content identification information 5401 is configured with share name 5401a and file path 5401b. The storage position information 5404 is configured with offset 5404a and data length 5404b. The metadata 5405 is configured with update time 5405a and access control information 5405b.

In the following description of the backup catalog information management table 5400, a content managed within a certain entry in the backup catalog information management table 5400 is referred to as content concerned.

The content identification information 5401 is information for uniquely identifying a content of a certain generation included in the backup file 11a for NAS data 10a. The share name 5401a is a management unit of the NAS data 10a. A share name includes a plurality of contents. The file path 5401b is an identifier for uniquely identifying a content having a certain share name.

The generation information 5402 is information indicating in which round of execution of the backup control process 5200 the content was backed up. The generation information 5402 has identifiers such as "generation 1," "generation 2," or "generation 3." The backup control process 5200 will be described later.

The relation with previous generation 5403 is information indicating a relation of the content concerned with a previous generation thereof. For example, for a content having the generation information 5402 of "Generation 2," the relation with previous generation 5403 indicates a relation with generation information "generation 1." A value of the relation with previous generation 5403 is any one of, for example, "added," "updated," and "deleted."

"Added" indicates that the interested content is a content added to the NAS data 10a after execution of the backup control process 5200 which is execution of the previous generation. "Updated" indicates that the content concerned is a content updated after execution of the backup control process 5200 which is execution of the previous generation. "Deleted" indicates that the content concerned is a content deleted after execution of the backup control process 5200 which corresponds to the execution of the previous generation.

The storage position information 5404 is information on the storage position of the content concerned in the backup file 11a. The offset 5404a indicates an offset, of the content concerned, in the backup file 11a. For a deleted content, "N/A" which is an invalid value is designated in the offset 5404a.

The data length 5404b indicates the data length of the content concerned. For a deleted content, "N/A" which is an invalid value is designated in the data length 5404b.

The metadata 5405 is information on the content concerned. The metadata 5405 includes update time 5405a and access control information 5405b.

The metadata 5405 may include generation time, last access time, and the like, in addition to the update time 5405a. The update time indicates the time when the content concerned was updated. The generation time indicates the time when the content concerned was generated. The last access time indicates the time when the content concerned was accessed most recently. For a deleted content, "N/A" which is an invalid value is designated in the update time 5405a.

The access control information 5405b includes a user identifier of a user who is authorized to access the content concerned and a group identifier of a group which is authorized to access the content concerned. For a deleted content, "N/A" which is an invalid value is designated in the access control information 5405b.

The example in FIG. 13 shows that a content having "ShareA," "/dirA/fileA," and "Generation 1" as values of the share name 5401a, the file path 5401b, and the generation information 5402, respectively, has values of "Added," "0," and "4096" as values of the relation with previous generation 5403, the offset 5404a, and the data length 5404b, respectively.

In addition, a user identifier of a user who is authorized to access the content concerned is "UserA," and a group identifier of a group which is authorized to access the content concerned is "GroupA." Although not illustrated, the update time 5405a has a value such as "2010/10/10 19:30."

FIG. 14 shows a configuration example of the backup catalog information management table 5500 for mails.

The backup catalog information management table 5500 for mails is a table for storing information on the contents included in the backup file 11b which is a backup file storing the replicas of the contents included in the mail data 10b.

The backup catalog information management table 5500 for mails is configured with content identification information 5501, generation information 5502, a relation with previous generation 5503, storage position information 5504, and metadata 5505. The content identification information 5501 is configured with account information 5501a and mail ID 5501b. The storage position information 5504 is configured with offset 5504a and data length 5504b. The metadata 5505 is configured with update time 5505a and access control information 5505b.

The content identification information 5501 is information for uniquely identifying a content of a certain generation included in the backup file 11b for the mail data 10b. An account is a management unit of the mail data 10b. An account includes a plurality of mails (contents). The mail ID 5501b is an identifier for uniquely identifying a content included in a certain account.

The generation information 5502, the relation with previous generation 5503, the storage position information 5504, and the metadata 5505 are the same as the generation information 5402, the relation with previous generation 5403, the storage position information 5404, and the metadata 5405, respectively. Thus, description thereof will be omitted here.

The example in FIG. 14 shows that a content having "UserA," "Mail 1," and "Generation 1" as values of account information 5501a, mail ID 5501b, and generation information 5502, respectively, has values of "Added," "0," and "4096" as values of relation with previous generation 5503, offset 5504a, and data length 5504b, respectively.

In addition, a user identifier of a user who is authorized to access the interested content is "UserA," and a group identifier of a group which is authorized to access the interested content is "GroupA."

FIG. 15 shows a configuration example of the backup catalog information management table 5500 for collaboration.

The backup catalog information management table 5600 for collaboration is a table for storing information on the contents included in the backup file 11c which is a backup file storing the replicas of the contents included in the collaboration data 10c.

The backup catalog information management table 5600 for collaboration is configured with content identification information 5601, generation information 5602, relation with previous generation 5603, storage position information 5604, and metadata 5605. The content identification information 5601 is configured with project information 5601a and a file path 5601b. The storage position information 5604 is configured with offset 5604a and data length 5604b. The metadata 5605 is configured with update time 5605a and access control information 5605b.

The content identification information 5601 is information for uniquely identifying a content of a certain generation included in the backup file 11c for the collaboration data 10c. A project is a management unit of the collaboration data 10c. A project includes a plurality of contents. The file path 5601b is an identifier for uniquely identifying a content included in a certain project.

The generation information 5602, the relation with previous generation 5603, the storage position information 5604, and the metadata 5605 are the same as the generation information 5402, the relation with previous generation 5403, the storage position information 5404, and the metadata 5405, respectively. Thus, description thereof will be omitted here.

The example in FIG. 15 shows that a content having "ProjectA," "/dirA/fileA," and "Generation 1" as values of project information 5601a, file path 5601b, and generation information 5602, respectively, has "Added," "0," and "4096" as values of relation with previous generation 5603, offset 5604a, and data length 5604b, respectively.

In addition, a user identifier of a user who is authorized to access the content concerned is "UserA," and a group identifier of a group which is authorized to access the content concerned is "GroupA."

FIG. 16 shows a configuration example of the aggregation data management table 3500.

The aggregation data management table 3500 is a table for storing information on the contents included in the aggregation data 14 (the backup files 11a, 11b, 11c).

The aggregation data management table 3500 is configured with global content identification information 3501, generation information 3502, storage position information 3503, and metadata 3504.

The storage position information 3503 is configured with file 3503a, offset 3503b, and data length 3503c. The metadata 3504 is configured with update time 3504a and access control information 3504b.

In the following description of the aggregation data management table 3500, a content corresponding to a certain entry in the aggregation data management table 3500 is referred to as the content concerned.

The global content identification information 3501 is an identifier for the client apparatus 2 to uniquely identify a content included in the aggregation data 14 (in the backup files 11a, 11b, and 11c).

The generation information 3502 is information indicating in which round of execution of the backup control process 5200 the content is backed up. The generation information 3502 has identifiers such as "generation 1," "generation 2," or "generation 3." The backup control process 5200 will be described later.

The storage position information 3503 is information indicating a storage position of the content concerned in the storage media of the storage apparatus 4s and is information on the storage position of the content concerned in the aggregation data 14 or the update data 13.

The file 3503a is an identifier for specifying the file storing the backup file 11 or the update data 13. The offset 3503b shows an offset of the content concerned in the backup file 11 or the update data 13. The data length 3503c shows the length of data of the content concerned.

Those included in the metadata 3504 are the same as in the metadata 5405 in the backup catalog information management table 5400 for NAS, and thus a description thereof will be omitted.

The example in FIG. 16 shows that entries "/NAS/ShareA/dirA/fileA" and "generation 1" as the global content identification information 3501 and the generation information 3502, respectively, has values of "File_a," "0," and "4096" as values of file 3503a, offset 3503b, and data length 3503c, respectively.

In addition, a user identifier of a user who is authorized to access a content corresponding to the concerned entry concerned is "UserA," and a group identifier of a group which is authorized to access the content concerned is "GroupA."

FIG. 17 shows a configuration example of the alias management table 3800.

The alias management table 3800 is a table for managing aliases provided for the global content identification information 3501 in the aggregation data management table 3500.

The alias management table 3800 includes an alias (a detail global identifier) of global content identification information 3801, associated global content identification information 3802, and associated generation information 3803.

The alias of global content identification information 3801 holds aliases of contents uniquely identified by the associated global content identification information 3802 and the associated generation information 3803.

In other words, global content identification information, generation information associated with the global content identification information, and an alias of the global content identification information are stored in the alias management table 3800 in association with each other on the basis of the generation information of the global content identification information.

For example, in the example in FIG. 17 shows that a content uniquely identified by a value "/NAS/ShareA/dirA/fileA" of the associated global content identification information 3802 and a value "generation 1" of the associated generation information 3803 is assigned such an alias "/.snap/2010-10-8/NAS/ShareA/dirA/fileA" that includes the date and time when a full backup or an incremental backup was executed. The content corresponds to the content described in the first entry in the aggregation data management table 3500 shown in FIG. 16.

FIG. 18 shows a configuration example of an application management table 5300.

The application management table 5300 is a table for managing a list of applications being a subject of the backup control process 5200 and includes columns of address 5301, application type 5302, and associated character string 5303.

The address 5301 is an identifier for identifying the application program, and is configured with, for example, an IP address of the server which executes the application program. Note that the address 5301 may include a port number.

The application type 5302 shows the type of an application. The application type 5302 holds therein, for example, such values as "NAS," "mail," and "collaboration."

The associated character string 5303 shows a character string associated with the application type 5302. For example, the application types 5302 are "NAS," "mail," and "collaboration," and the associated character strings 5303 are "NAS," "Mail," and "Collaboration," respectively. The associated character string 5303 is used when global content identification information is generated in S3006 in the aggregation data management table update process 3000.

Meanwhile, the content aggregation server 3 stores a replica of the application management table 5300 therein. Since the application management table replica 3700 is a replica of the application management table 5300 and has the same configuration as that of the application management table 5300, a description thereof will be omitted.

Next, a description is given of a flow of the various processes executed by the information processing system 1 in the first embodiment. When the subject is omitted in the following description, the subject is the aforementioned CPU, the controller or the like. The letter "S" denotes step.

Figure 19:
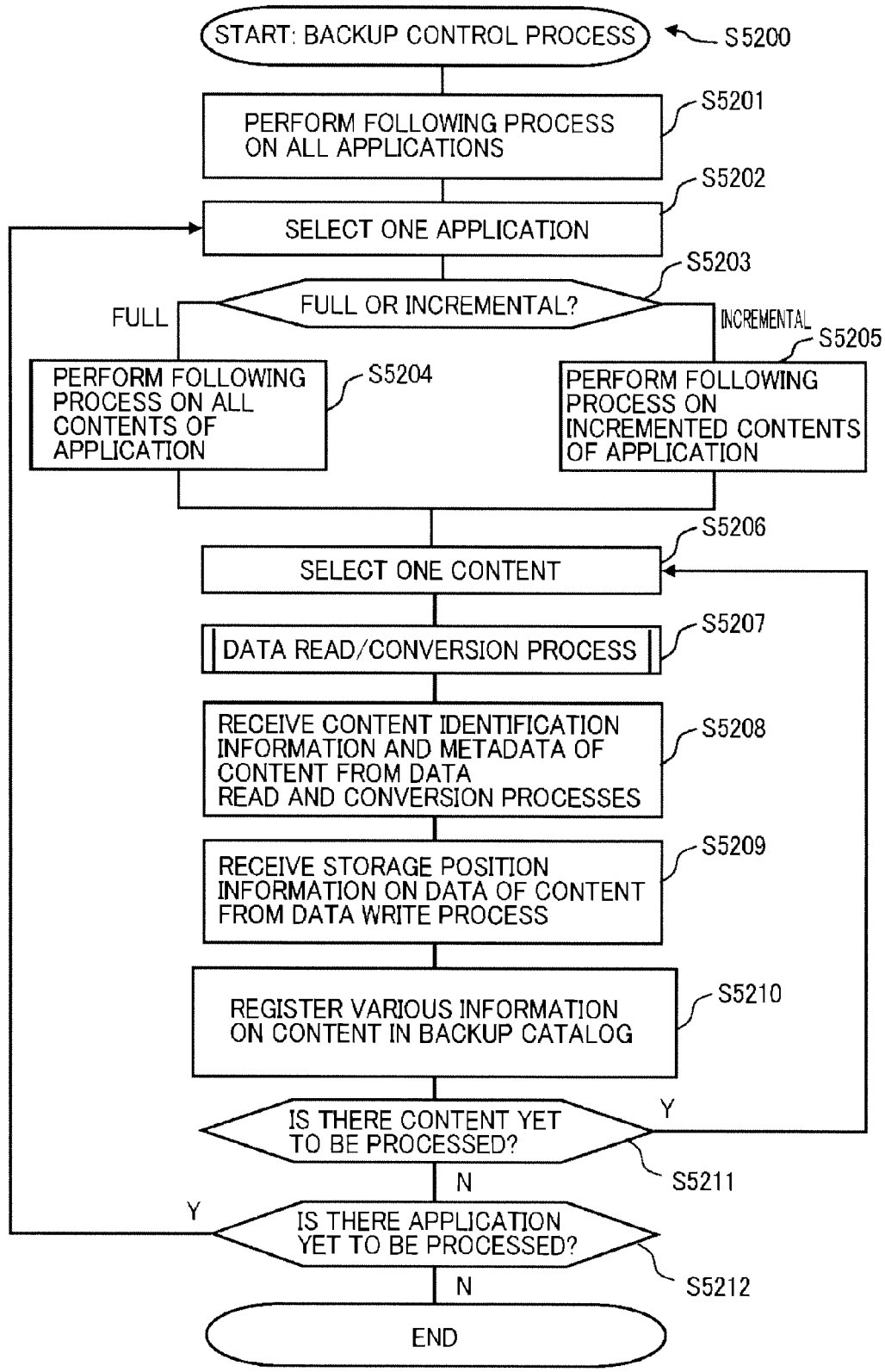
FIG. 19 is a flowchart showing a flow of a backup process according to an embodiment.

FIG. 19 shows an example of a process flow of the backup control process 5200.

The backup control process 5200 is activated by an unillustrated backup scheduling program running on the backup server 5, for example, at a predetermined time (for example, at 24:00 or the like every day). The backup control process 5200 is a process that performs full backup or incremental backup on a content included in the application data 10 (the NAS data 10a, the mail data 10b, the collaboration data 10c).

Whether the full backup is executed or the incremental backup is be executed is set in advance by an operator or the like of the client apparatus 2. When the backup process is activated, the backup scheduling program executes the backup process in accordance with the setting details.

In S5201, the backup server 5 executes the following process on all the applications included in the application management table 5300.

In S5202, the backup server 5 selects one application to be the subject of the process (application concerned).

In S5203, the backup server 5 judges whether the full backup or the incremental backup is to be executed in this-time backup control process 5200.

If the backup server 5 is to execute a full backup ("Full" in S5203), in S5204 the backup server 5 transmits a transmission request for all the contents in all the files generated by the application program of the application to be the subject of the process, to a server apparatus which executes the application program.

Concretely, the backup server 5 transmits the transmission request for the contents: to the backup server in a case of backup of NAS data 10a; to the mail server 6 in a case of backup of the mail data 10b; or to the collaboration server 7 in a case of backup of the collaboration data 10c.

When executing the incremental backup for a process target application ("Incremental" in S5203), the backup server 5 transmits a transmission request to a server apparatus running the application program of the target application, in S5205, for transmission of some of contents included in the application data 10 of the target application which are contents added, updated or deleted (incremented contents) after the previous execution of the back up control process 5200.

Then, the server apparatus receiving the transmission request described above selects one content to be processed (content concerned) (S5206).

In S5207, the server apparatus instructs a program for the data read/conversion process 5000, 6000, or 7000 (for application types NAS, Mail or Collaboration, respectively) to perform the process on the content concerned. Specific process details of the data read/conversion processes 5000, 6000, and 7000 will be described later.

Then, in S5208 the backup server 5 receives content identification information and metadata of the content concerned from the program for data read/conversion process 5000, 6000 or 7000 (for application types NAS, Mail or Collaboration, respectively).

In S5209, the backup server 5 receives storage position information on data of the content concerned from a program for the data write process 5100.

In S5210, the backup server 5 registers the various information on the content in the corresponding backup catalog. Specifically, an entry is added: to the backup catalog information management table 5400 for NAS when the application in subject for the process is for NAS; to the backup catalog information management table 5500 for mail when the application is for mail; or to the backup catalog information management table 5600 for collaboration when the application is for collaboration.

In the added entry which is the content identification information 5401, 5501 or 5601, the received content identification information is set. In the generation information 5402, 5502 or 5602 of the added entry, generation information (such as "Generation 1" or "Generation 2") appropriate for this-time execution of the backup control process 5200 is set.

Specifically, when the same content identification information as the received content identification information has already been stored in the backup catalog, the backup server 5 generates new generation information by incrementing the latest generation, by one, in the generation information associated with the content identification information. Then, the backup server 5 stores the generated generation information in the generation information 5402, 5502 or 5602.

If the content concerned is added, updated or deleted after the previous backup control process 5200, a value "Added," "Updated," or "Deleted" is set in relation with the previous generation 5403, 5503 or 5603 of the added entry.

The backup server 5 sets the received storage position information in the storage position information 5404, 5504 or 5604 of the added entry. The backup server 5 sets the received metadata in the metadata 5405, 5505 or 5605 of the added entry.

In S5211, the backup server 5 inquires of the server apparatus whether or not a content yet to be processed exists. In S5211, the server apparatus judges whether a content yet to be processed exists. If such content exists ("Y" in S5211), the server apparatus proceeds to S5206. If such content does not exist ("N" in S5211), the server apparatus proceeds to S5212.

If the content yet to be processed does not exist, the server apparatus transmits information indicating to that effect to the backup server 5.

Then, in S5212 the backup server 5 judges whether an application yet to be processed exists. If such application exists ("Y" in S5212), the backup server 5 proceeds to S5202. If such application does not exist ("N" in S5212), the backup control process 5200 is terminated.

Figure 20:
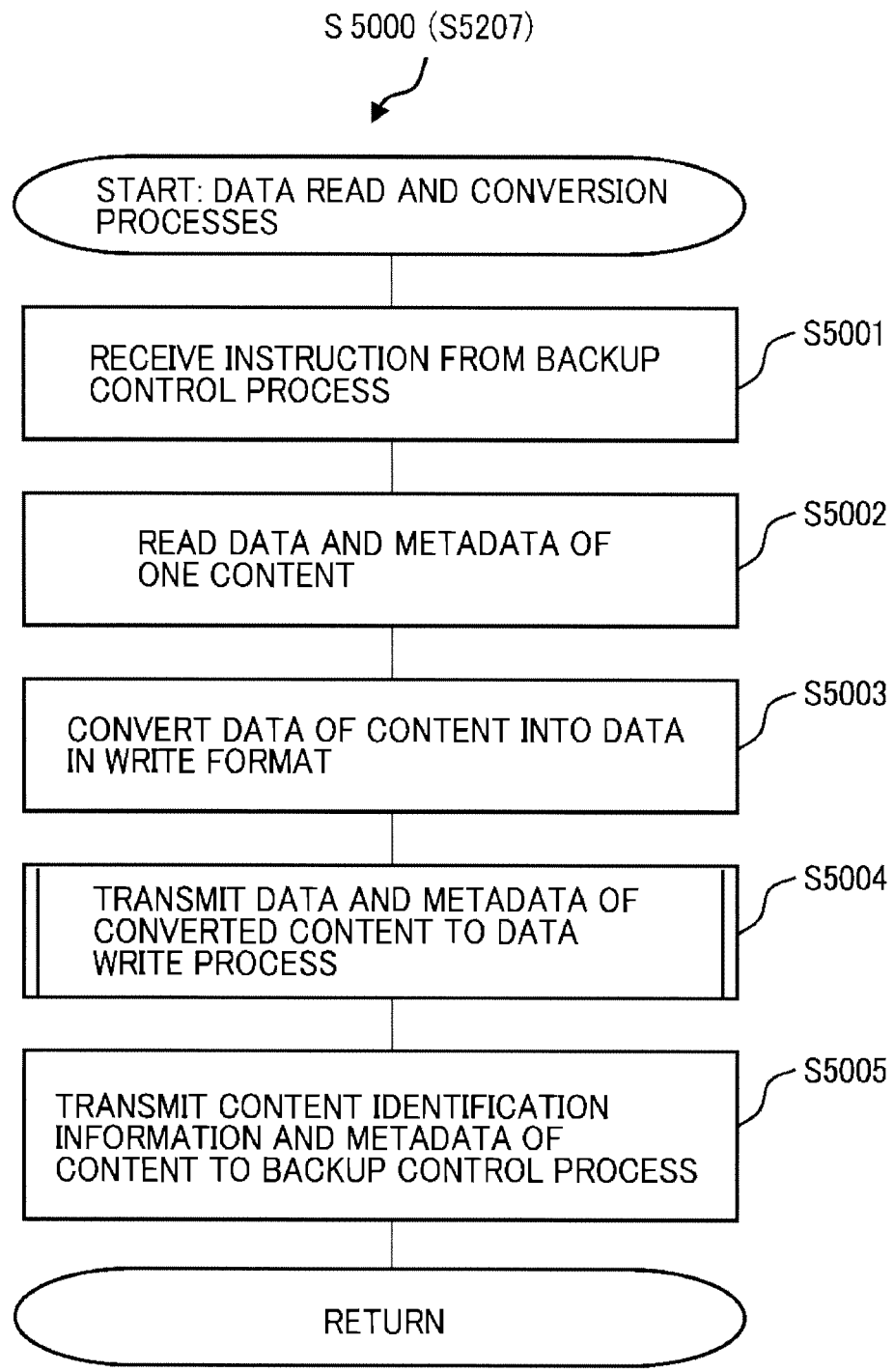
FIG. 20 is a flowchart showing a flow of a data read and conversion process according to an embodiment.

FIG. 20 shows an example of a process flow of the data read and conversion process 5000 in S5207 shown in FIG. 19. The data read and conversion processes 6000 and 7000 have the same process flow as the process flow of the data read/conversion process 5000.

In S5001, the server apparatus receives an instruction for the aforementioned process from the backup control process 5200.

In S5002, the server apparatus reads data and metadata of one content included in the application data 10 (NAS data 10*a*, mail data 10 or collaboration data 10*c*).

In S5003, the server apparatus converts the read data of the content into data in a write format. This conversion causes the format of the thus read content to be converted from a format specific to an application into a common format.

In S5004, the server apparatus transmits the converted content data and the read metadata to the program for the data write process 5100. The data write process 5100 will be described later.

In S5005, the backup server 5 transmits content identification information and metadata of the content in subject for the process, to the backup control process 5200.

Figure 21:
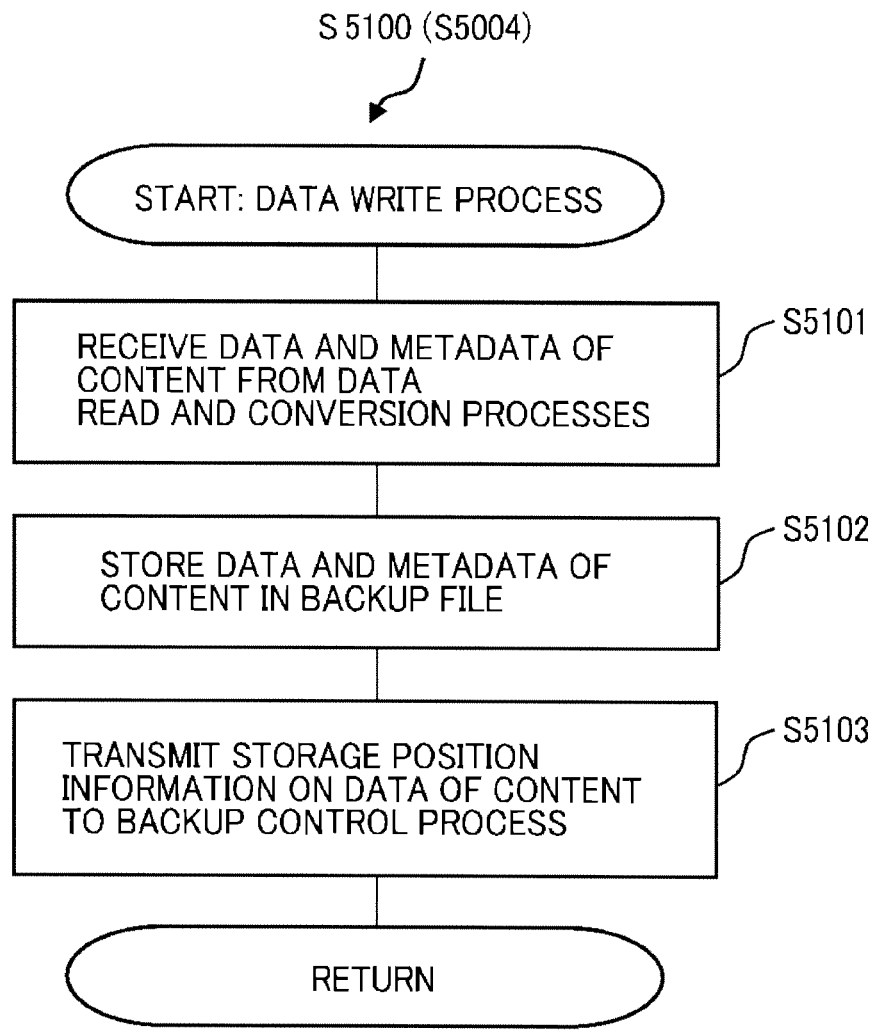
FIG. 21 is a flowchart showing a flow of a data write process according to an embodiment.

FIG. 21 shows an example of a process flow of the data write process 5100 in S5004 illustrated in FIG. 20.

In S5101, the backup server 5 receives the data and the metadata of the content from the data read/conversion process 5000, 6000 or 7000.

In S5102, the backup server 5 stores the received data and metadata of the content in the backup file. Specifically, the backup server 5 stores the received data and the metadata of the content: in the backup file 11*a*, the backup file 11*b*, or in the backup file 11*c* when the content is the NAS data 10*a*, the mail data 10*b* or the collaboration data 10*c*, respectively.

In S5103, the backup server 5 identifies information (the offset and the data length) on a position at which the data is stored in S5102 and transmits the identified storage position information of the data to the program for the backup control process 5200.

In the above described manner, the backup process is performed in which a replica of a content in each of the files stored in the storage media of the storage apparatus 4*t* is stored in the storage media of the storage apparatus 4*s*.

Figure 22:
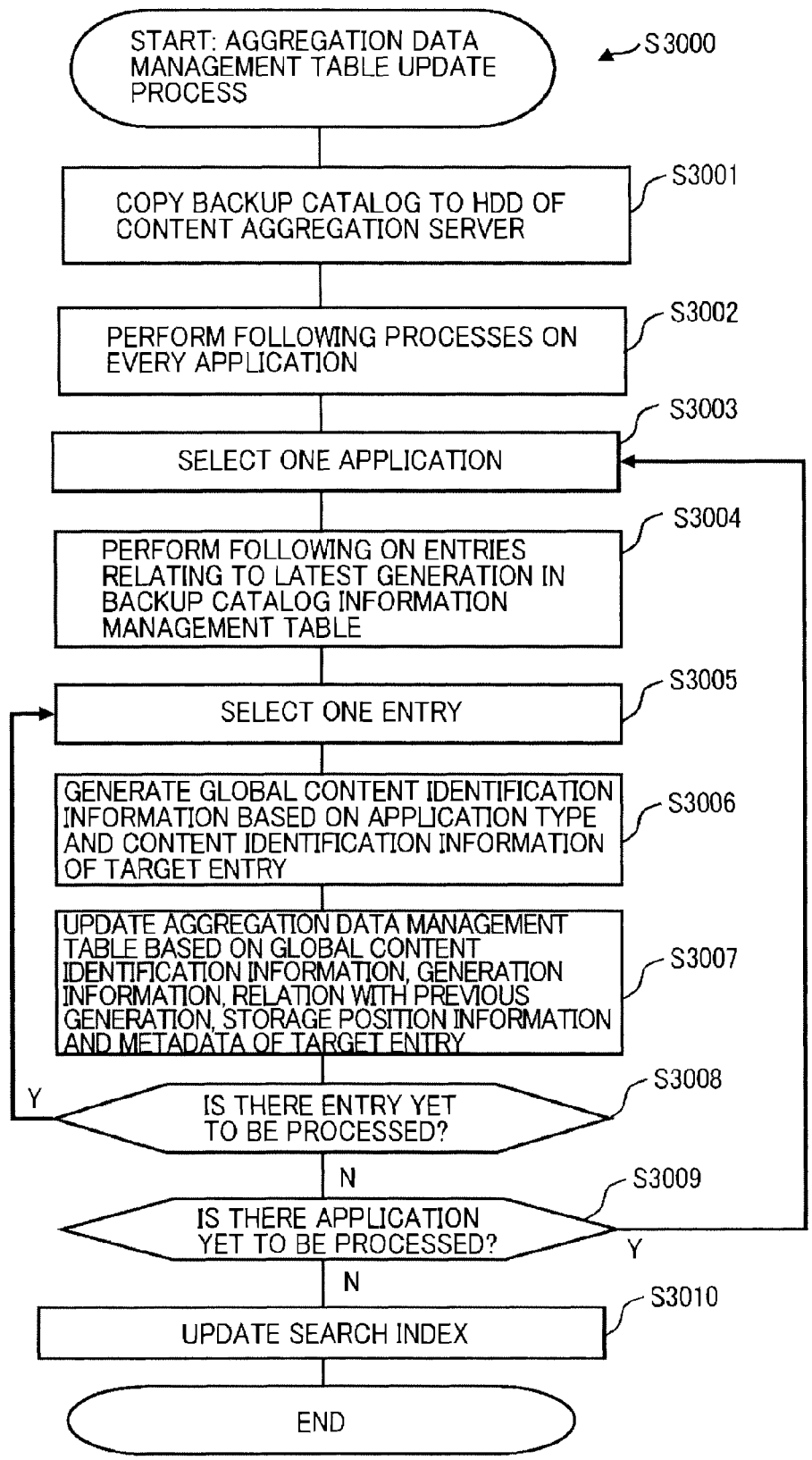
FIG. 22 is a flowchart showing a flow of an aggregation data management table update process according to an embodiment.

FIG. 22 shows an example of a process flow of the aggregation data management table update process 3000 executed by the content aggregation server 3. The aggregation data management table update process 3000 is executed after the backup control process 5200 is completed.

In S3001, the content aggregation server 3 copies the backup catalog group 15 (concretely, the backup catalogs 12*a*, 12*b*, and 12*c*) stored in the storage apparatus 4*s*, to the HDD 33 of the content aggregation server 3.

In S3002, the content aggregation server 3 performs steps in and after S3003 on all the applications included in the application management table replica 3700.

In S3003, the content aggregation server 3 selects one application from the application management table replica 3700.

In S3004, the content aggregation server 3 identifies a backup catalog information management table (one of the backup catalog information management tables 5400, 5500, and 5600) appropriate for the selected application and performs steps in and after S3005 on entries of the latest generation (having the largest N of Generation "N") in the generation information (generation information 5402, 5502, or 5602) among the entries included in the identified backup catalog information management table.

In S3005, the content aggregation server 3 selects one (referred to as a target entry) of the entries of the identified backup catalog information management table (5400, 5500 or 5600).

In S3006, the content aggregation server 3 generates global content identification information on the application type and the content identification information of the target entry.

Specifically, the content aggregation server 3 firstly identifies a character string (associated character string 5303) associated with the application based on the application type of the application in subject for the process.

Next, the content aggregation server 3 connects, as a character string, entries (share name 5401*a* and file path 5401*b* in a case of NAS, account information 5501*a* and mail ID 5501*b* in a case of a mail, or project information 5601*a* and file path 5601*b* in a case of a collaboration) together, the entries included in the content identification information (content identification information 5401, 5501 or 5601) of the target entry. Thereby, the content aggregation server 3 acquires a character string associated with the content identification information of the content. Lastly, the content aggregation server 3 connects the character string associated with the application and the character string associated with the content identification information together and thereby acquires global content identification information.

With regard to the generation of the global content identification information, an example of a case of a NAS is shown. In the case of the NAS, the character string to be associated with the application is "NAS" (according to the first entry of the application management table 5300). Whereas, the character string to be associated with the content identification information, which is acquired from the first entry of the backup catalog information management table 5400 for NAS in FIG. 13 is "/ShareA/dirA/FileA" acquired by connecting "ShareA" and "/dirA/fileA." Accordingly, the global content identification information for the first entry of the backup catalog information management table 5400 for NAS is generated as "/NAS/ShareA/dirA/FileA."

In S3007, the content aggregation server 3 updates the aggregation data management table 3500 based on global content identification information, generation information, relation with previous generation, storage position information, and metadata of the target entry.

Specifically, the content aggregation server 3 firstly adds a new entry to the aggregation data management table 3500. Next, the content aggregation server 3 performs the following process based on a value of the relation with a previous generation (5403, 5503 or 5603) in the target entry.

When the value of the relation with a previous generation is "Added" or "Updated," the content aggregation server 3 sets the global content identification information generated in S3506 in the global content identification information 3501 of the new entry.

Then, in a field of the file 3503a of the new entry, the content aggregation server 3 sets an identifier for a backup file ("File_a" for NAS, "File_b" for Mail, or "File_c" for Collaboration) according to the application type.

Furthermore, in the fields of the generation information 3502, the offset 3503b, the data length 3503c, the update time 3504a, and the access control information 3504b in the new entry, the content aggregation server 3 sets: associated information in the backup catalog information management table 5400 for NAS in the case where the application type is NAS; associated information in the backup catalog information management table 5500 for mail in the case where the application type is Mail; or associated information in backup catalog information management table 5600 for collaboration in the case where the application type is Collaboration.

Next, in S3008, the content aggregation server 3 judges whether an entry yet to be processed exists. If such entry exists, the content aggregation server 3 proceeds to S3006. If such entry does not exist, the content aggregation server 3 proceeds to S3009.

In S3009, the content aggregation server 3 judges whether an application yet to be processed exists. If such application exists, the content aggregation server 3 proceeds to S3003. If such application does not exist, the content aggregation server 3 proceeds to S3010.

In S3010, the content aggregation server 3 updates the search index 3600 based on the information of the contents included in the updated aggregation data management table 3500.

In entries of the search index 3600, there are recorded a list of keywords (words) included in the contents in the aggregation data 14 and a list of global content identification information associated with contents each of which matches the key words.

Since the search index 3600 has been created, the content aggregation server 3 can thereby acquire the list of global content identification information of contents including specified key words, upon receipt of a search request in which the key words are specified, from the client apparatus 2. Then, the content aggregation server 3 can transmit the list to the client apparatus 2.

Figure 23:
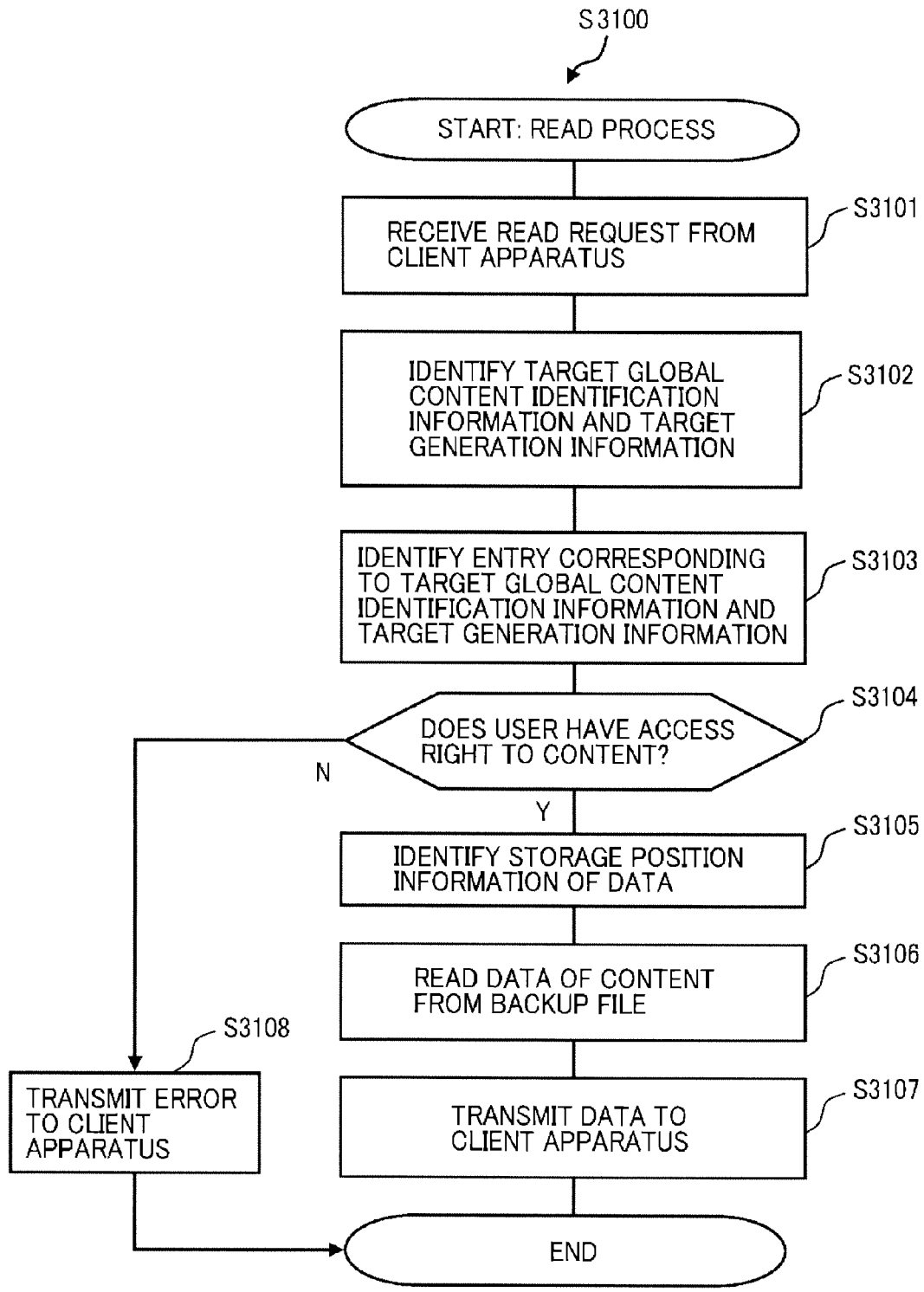
FIG. 23 is a flowchart showing a flow of a read process according to an embodiment.

FIG. 23 shows an example of a process flow of the read process 3100.

In S3101, the content aggregation server 3 receives a read request from the client apparatus 2. Global content identification information (a global identifier or a detail global identifier) of a content to be accessed is specified in the read request.

In S3102, the content aggregation server 3 identifies global content identification information of the access target content (referred to as target global content identification information) and generation information (referred to as target generation information) thereof. The target global content identification information and the target generation information are required to uniquely identify the contents in the aggregation data management table 3500.

Specifically, the content aggregation server 3 firstly refers to the alias management table 3800 to check if there is an entry in which the alias of global content identification information 3801 matches the specified global content identification information.

If there is a matching entry, the content aggregation server 3 uses the associated global content identification information 3802 included in the entry as the target global content identification information and uses the associated generation information 3803 included in the entry as the target generation information.

If there is no matching entry, the content aggregation server 3 uses the specified global content identification information as the target global content identification information and uses the latest generation (a generation having the largest N of Generation "N") as the target generation information.

In S3103, the content aggregation server 3 refers to the aggregation data management table 3500 to identify an entry corresponding to the target global content identification information and the target generation information which were identified.

Specifically, the content aggregation server 3 searches for an entry (referred to as a target entry) in which the global content identification information 3501 and the generation information 3502 respectively match the target global content identification information and the target generation information identified at S3102.

When a matching entry is not found, the content aggregation server 3 transmits an error to the client apparatus 2 to terminate the process.

When finding a matching entry, the content aggregation server 3 performs the steps in and after S3104 on the entry found, as the target entry.

In S3104, the content aggregation server 3 judges whether a user who made the read request (user concerned) has an access right to a content (referred to as a target content) corresponding to the target entry.

Specifically, the content aggregation server 3 refers to the access control information 3504b in the aggregation data management table 3500 and thereby judges if the user concerned is a user who is authorized to access the target content or if the user concerned belongs to a group which is authorized to access the target content.

If this is the case, the content aggregation server 3 judges that the user concerned has the access right to the target content. If this is not the case, the content aggregation server 3 judges that the user concerned does not have the access right to the target content.

If the content aggregation server 3 judges that the user concerned has the access right ("Y" in S3104), the content aggregation server 3 proceeds to S3105. If the content aggregation server 3 judges that the user concerned does not have the access right ("N" in S3104), the content aggregation server 3 proceeds to S3108.

In S3105, the content aggregation server 3 refers to the storage position information 3503 of the target entry and thereby identifies the storage position information of data of the target content.

In S3106, the content aggregation server 3 reads the data of the target content from the backup file based on the storage position information identified in S3105. Specifically, the content aggregation server 3 reads the data of the target content at the position corresponding to the identified storage position information in any one of backup files 11a, 11b or 11c, according to the application type.

In S3107, the content aggregation server 3 transmits the read data to the client apparatus 2.

In S3108, the content aggregation server 3 transmits a message indicating an error to the client apparatus 2.

Figure 24:
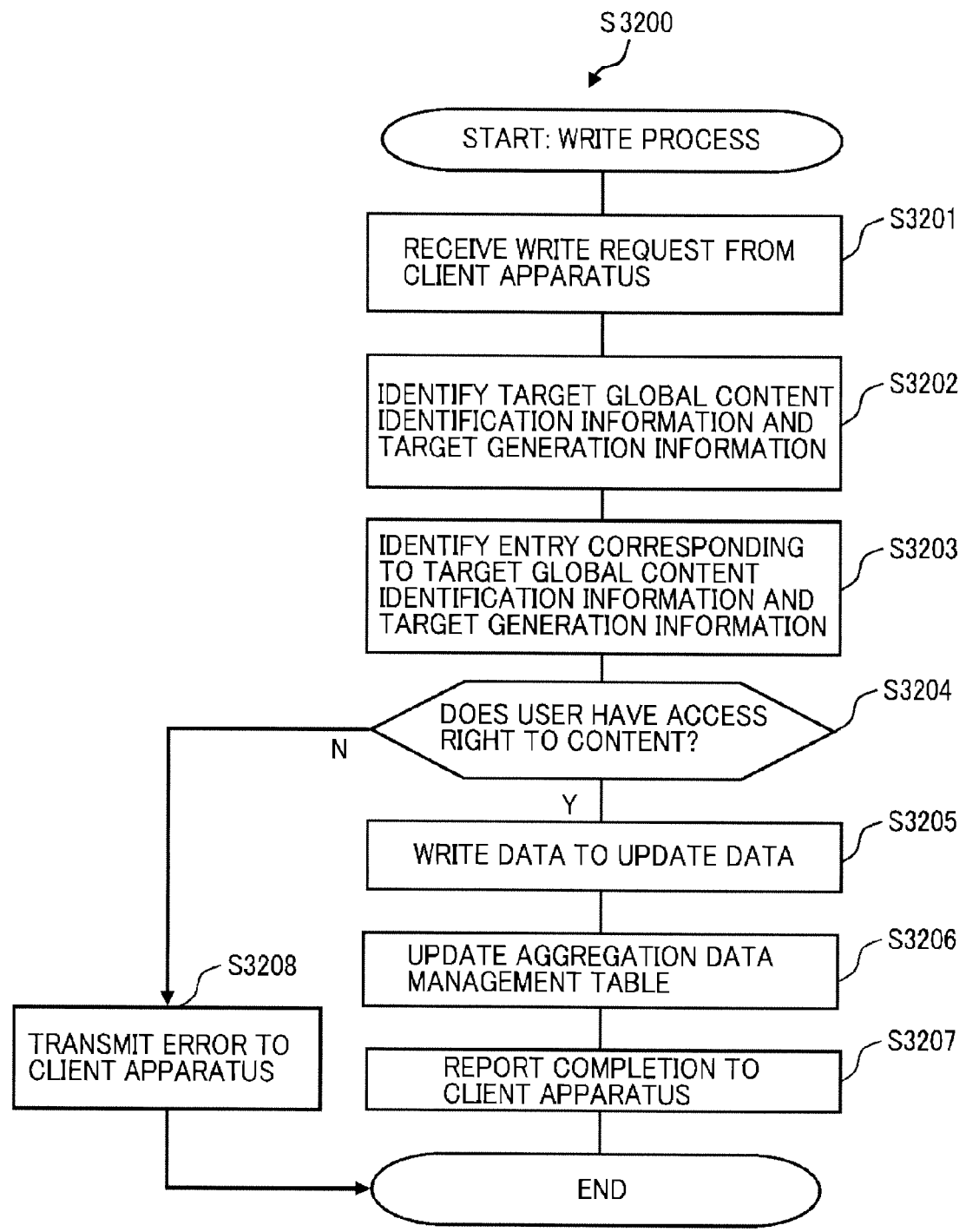
FIG. 24 is a flowchart showing a flow of a write process according to an embodiment.

FIG. 24 shows an example of a process flow of the write process 3200.

In S3201, the content aggregation server 3 receives a write request from the client apparatus 2. The write request includes global content identification information of a content to be accessed, data to be written (an updated content), and metadata thereof.

In S3202, the content aggregation server 3 identifies global content identification information of the content to be accessed (referred to as target global content identification information) and generation information (referred to as target generation information) thereof. The specific process is the same as that in S3102 for the read process 3100.

In S3203, the content aggregation server 3 refers to the aggregation data management table 3500 to identify an entry corresponding to the target global content identification information and the target generation information which were identified.

Specifically, the content aggregation server 3 searches for an entry (referred to as a target entry) in which the global content identification information 3501 and the generation information 3502 respectively match the target global content identification information and the target generation information. There are cases where a matching entry is found and is not found. A case where a matching entry is found is a case where an existing entry is updated. A case where a matching entry is not found is a case where a new entry is added (an entry is updated or added in S3206.)

If the entry is found, the content aggregation server 3 judges in S3204 whether a user who made the write request (user concerned) has an access right to the content (the target content) corresponding to the target entry.

On the other hand, if the entry is not found, the content aggregation server 3 judges whether the user who made the write request (user concerned) has the access right to a target directory (a directory in which the write target data is to be stored).

A specific process in the case where the entry was found is the same as that in 53104 for the read process 3100.

The specific process in the case where an entry was not is as follows. That is, the content aggregation server 3 refers to the access control information 3504b in the aggregation data management table 3500 and thereby judges if the user concerned is a user who is authorized to access the target directory or the user concerned belongs to a group which is authorized to access the target directory. If this is the case, the content aggregation server 3 judges that the user concerned has the access right to the target directory. If this is not the case, the content aggregation server 3 judges that the user concerned does not have the access right to the target directory.

If the content aggregation server 3 judges that the user concerned has the access right (access right to the target content in the case the entry is found and access right to the target directory in the case the entry is not found) ("Y" in S3204), the content aggregation server 3 proceeds to S3205.

If the content aggregation server 3 judges that the user concerned does not have the access right ("N" in S3204), the content aggregation server 3 proceeds to S3208.

In S3205, the content aggregation server 3 writes the data transmitted with the write request, to not the aggregation data 14 but the update data 13. In short, the content aggregation server 3 writes the updated content which is transmitted with the write request at a storage position different from the storage position at which the content before the update is stored. This makes it possible to save data in the content before the update, even if the content is updated.

Then, in S3206, the content aggregation server 3 updates the aggregation data management table (update management table) 3500. Specifically, if the matching entry is found, the content aggregation server 3 sets information on a storage position at which the write target data is written in S3205, in the storage position information 3503 of the target entry ("FileUpdate" indicating a file for storing update data is designated in the file 3503a). The content aggregation server 3 also sets metadata specified in the write request in the metadata 3504 of the target entry.

On the other hand, if the entry is not found, the content aggregation server 3 adds a new entry to the aggregation data management table 3500 and sets information of the latest generation in the generation information 3502. In addition, the content aggregation server 3 sets the information on the storage position at which the write target data is written in S3205, in the storage position information 3503 of the new entry ("FileUpdate" indicating a file for storing update data is designated in the file 3503a.). The content aggregation server 3 also sets the metadata specified in the write request in the metadata 3504 of the new entry.

Thereby, when the client apparatus 2 makes a read request for the content next time, the content aggregation server 3 reads and transmits the write target data to the client apparatus 2.

In S3207, the content aggregation server 3 transmits a completion report to the client apparatus 2. In S3208, the content aggregation server 3 transmits an error to the client apparatus 2.

Figure 25:
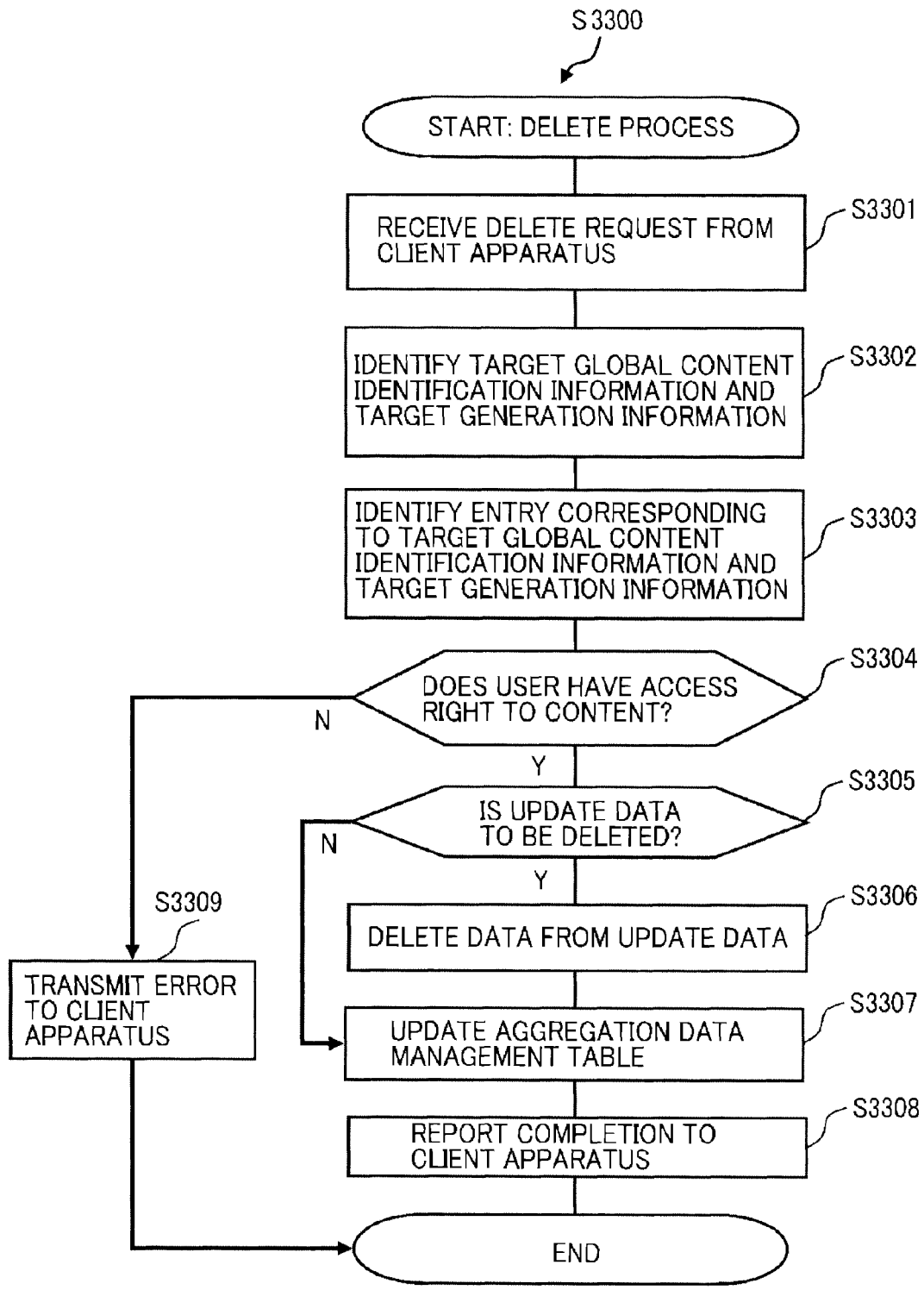
FIG. 25 is a flowchart showing a flow of a delete process according to an embodiment.

FIG. 25 shows an example of a process flow of the delete process 3300.

In S3301, the content aggregation server 3 receives a delete request for a content from the client apparatus 2. Global content identification information of the delete target content is specified in the delete request.

In S3302, the content aggregation server 3 identifies global content identification information (referred to as target global content identification information) of the delete target content and generation information (referred to as target generation information). The specific process is the same as that in S3102 for read process 3100.

In S3303, the content aggregation server 3 refers to the aggregation data management table 3500 to identify an entry corresponding to the target global content identification information and the target generation information which were identified.

Specifically, the content aggregation server 3 searches for an entry (referred to as a target entry) in which the global content identification information 3501 and the generation information 3502 respectively match the target global content identification information and the target generation information. There are cases where a matching entry is found and is not found.

The case where a matching entry is found is that where the delete target entry exists. In this case, the content aggregation server 3 proceeds to S3304. The case where a matching entry is not found is that where a delete target entry does not exist. When the entry is not found, the content aggregation server 3 terminates the process as an error.

In S3304, the content aggregation server 3 judges whether the user who made the delete request (the user concerned) has the access right to the content (referred to as a target content) corresponding to the delete target entry. The specific judgment step is the same that as in S3104.

If the content aggregation server 3 judges that the user has the access right ("Y" in S3304), the content aggregation server 3 proceeds to S3305. If the content aggregation server 3 judges that the user does not have the access right ("N" in S3304), the content aggregation server 3 proceeds to S3309.

In S3305, the content aggregation server 3 judges whether the delete target content is data included in the update data 13. Specifically, the content aggregation server 3 refers to the file 3503a of the delete target entry. If the file 3503a is "FileUpdate" indicating a file corresponding to the update data 13, the content aggregation server 3 judges that the delete target content is data included in the update data 13 ("Y" in S3305) and proceeds to S3306. If not ("N" in S3305), the content aggregation server 3 proceeds to S3307.

In S3306, the content aggregation server 3 deletes the delete target content from the update data 13. Specifically, the content aggregation server 3 refers to the storage position information 3503 of the delete target entry and thereby deletes data stored at the storage position.

In S3307, the content aggregation server 3 updates the aggregation data management table 3500. Specifically, the content aggregation server 3 sets "N/A" indicating an invalid value in the storage position information 3503 of the target entry and the metadata 3504 thereof.

As described above, if the client apparatus 2 transmits a delete request for a content, and even if a delete process is thereby performed, the content of the aggregation data 14 is not deleted. Thus, what is included in the original content can be saved.

In S3308, the content aggregation server 3 transmits a completion report to the client apparatus. In S3308, the content aggregation server 3 transmits an error to the client apparatus.

Figure 26:
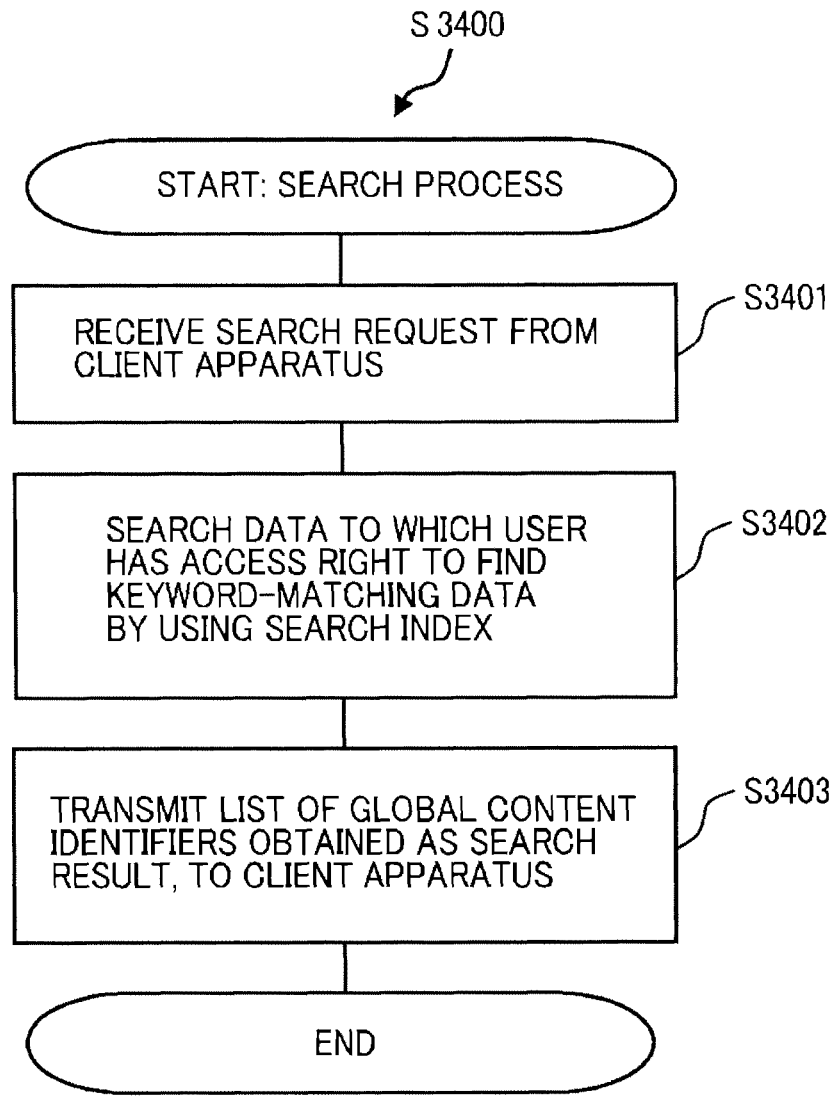
FIG. 26 is a flowchart showing a flow of a search process according to an embodiment.

FIG. 26 shows an example of a process flow of the search process 3400.

In S3401, the content aggregation server 3 receives a search request from the client apparatus 2. The search request includes a search query (words).

In S3402, the content aggregation server 3 searches as the target, contents in the aggregation data 14 to which the user having transmitted the search request has the access right, in order to find a list of global content identification information corresponding to a content including words matching keywords (the search query) by using the search index 3600. The content aggregation server 3 judges whether or not the user has the access right by referring to the access control information 3504b in the aggregation data management table 3500.

In S3403, the content aggregation server 3 transmits the list of global content identification information obtained as the search result to the client apparatus 2.

As described above, the present embodiment enables a unified way of accessing files generated by application programs configured to store contents in the files in different formats, without using a conversion program.

Note that the two storage apparatuses 4s and 4t are used as the storage apparatus for storing various data in the present embodiment however, one storage apparatus may store the various data. In addition, the present embodiment has shown an example in which the content aggregation server 3 and the backup server 5 are configured as physically separate server apparatuses however, the content aggregation server 3 and the backup server 5 may be configured as a single server apparatus. In addition, the backup file 11 may be created in an unillustrated tape apparatus besides the storage apparatus 4s.

Further, an archive server may be used instead of the backup server 5. The backup server 5, after recording in the storage apparatus 4t an alias of the content (original content) in the storage apparatus 4t, does not delete the original content whereas, the archive server after recording in the storage apparatus 4s an alias of the content (original content) in the storage apparatus 4t, deletes the original content. By using the archive server, for example, a content can be migrated from a storage media of high bit cost to a storage media of a low bit cost.

Second Embodiment

Next, a description is given of an information processing system 100 of a second embodiment with reference to FIGS. 27 to 34.

Figure 27:
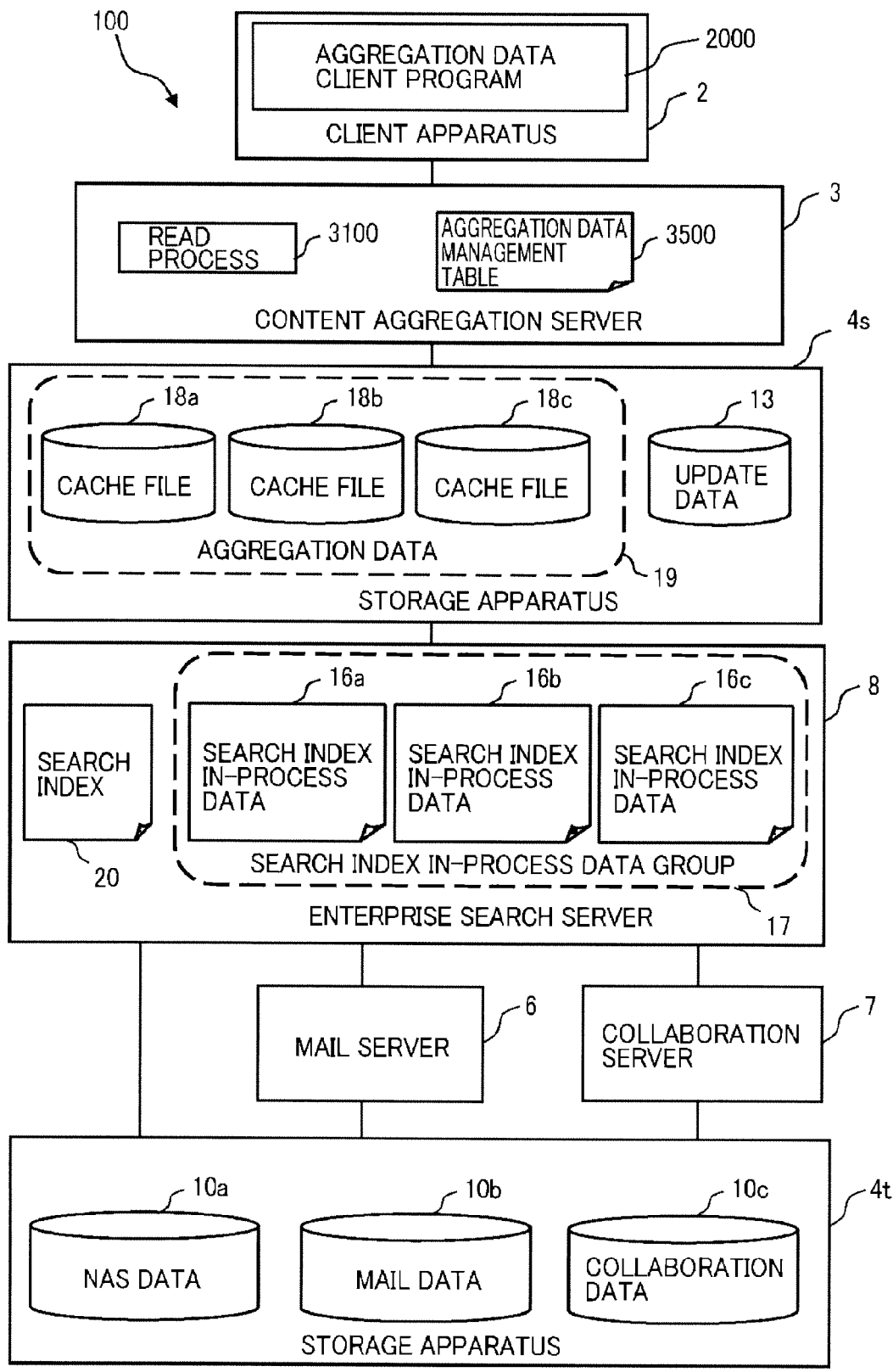
FIG. 27 is a diagram showing an overall configuration of an information processing system according to an embodiment.

FIG. 27 shows a configuration example of the information processing system 100 in the second embodiment. In the following description, portions different from the first embodiment will be described.

The information processing system 100 according to the second embodiment includes an enterprise search server 8. The enterprise search server 8 performs a content collection process by which replicas of contents in the files recorded in the storage media of the storage apparatus 4t are stored in the storage media of the storage apparatus 4s. Subsequently, the enterprise search server 8 extracts words described in each of the contents stored in the storage media of the storage apparatus 4s and then generates a search index (a file index) in which each of the extracted words and an identifier of a file including description of the extracted word are stored in association with each other on a word basis. In addition, from the client apparatus 2a or 2b, the enterprise search server 8 receives a search request for a file, in which words are specified, and transmits, to the client apparatus 2a or 2b, a list of file identifiers stored in the file index in association with the words.

More specifically, the enterprise search server 8 collects contents included in the application data 10, creates a search index (the file index) for the collected contents, and provides unillustrated client apparatuses 2a, 2b with a search result for the collected contents.

A hardware configuration of the enterprise search server 8 is the same as that of the backup server 5.

The enterprise search server 8 stores a search index 20 and a search index in-process data group 17 configured by search index in-process data 16.

In addition, in the second embodiment, the storage apparatus 4s stores aggregation data 19 configured by cache files 18, instead of the aggregation data 14 configured by the backup file 11.

Figure 28:
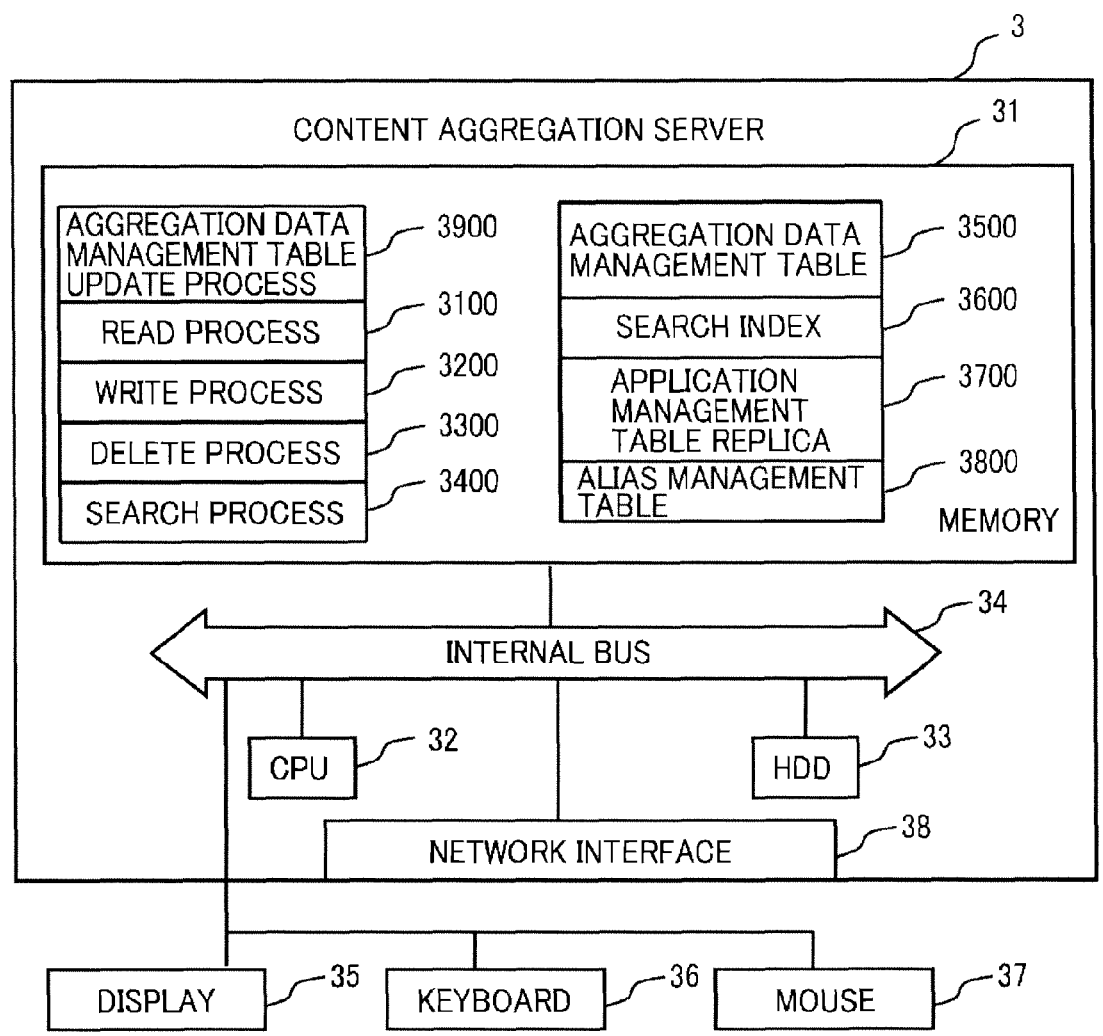
FIG. 28 is a diagram showing a configuration of a content aggregation server according to an embodiment.

FIG. 28 shows a hardware configuration diagram of a content aggregation server 3 in the second embodiment.

The content aggregation server 3 according to the second embodiment has approximately the same configuration as that of the content aggregation server 3 according to the first embodiment, but stores, in the memory 31, an aggregation data management table update process 3900 instead of the aggregation data management table update process 3000.

Figure 29:
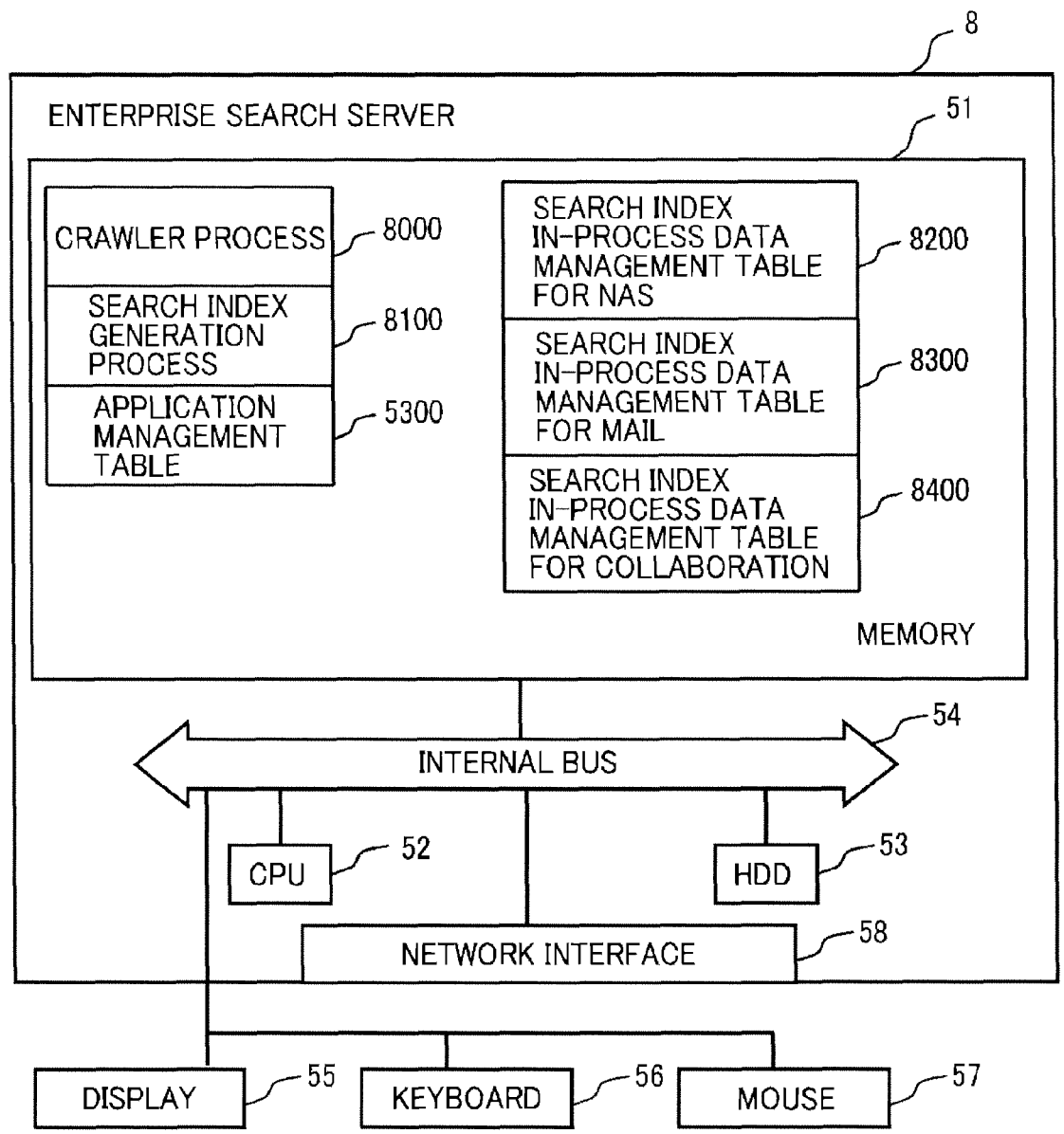
FIG. 29 is a diagram showing a configuration of an enterprise search server according to an embodiment.

FIG. 29 shows a hardware configuration diagram of the enterprise search server 8. The enterprise search server 8 has approximately the same configuration as the configuration of the backup server 5 described in the first embodiment, but stores in the memory 51: programs for performing processes such as a crawler process 8000 and a search index generation process 8100; and tables such as the application management table 5300 and search index in-process data management tables 8200, 8300, and 8400 for NAS, mail, and collaboration, respectively.

The crawler process 8000 is a program for executing the content collection process in which replicas of contents in files recorded in the storage media of the storage apparatus 4*t* are stored in the storage media of the storage apparatus 4*s*.

The search index generation process 8100 is a program for extracting words described in each of the contents stored in the storage media of the storage apparatus 4*s* and then generating a file index in which each of the extracted words and an identifier of a file including description of the extracted word are stored in association with each other on a word basis.

Figure 30:
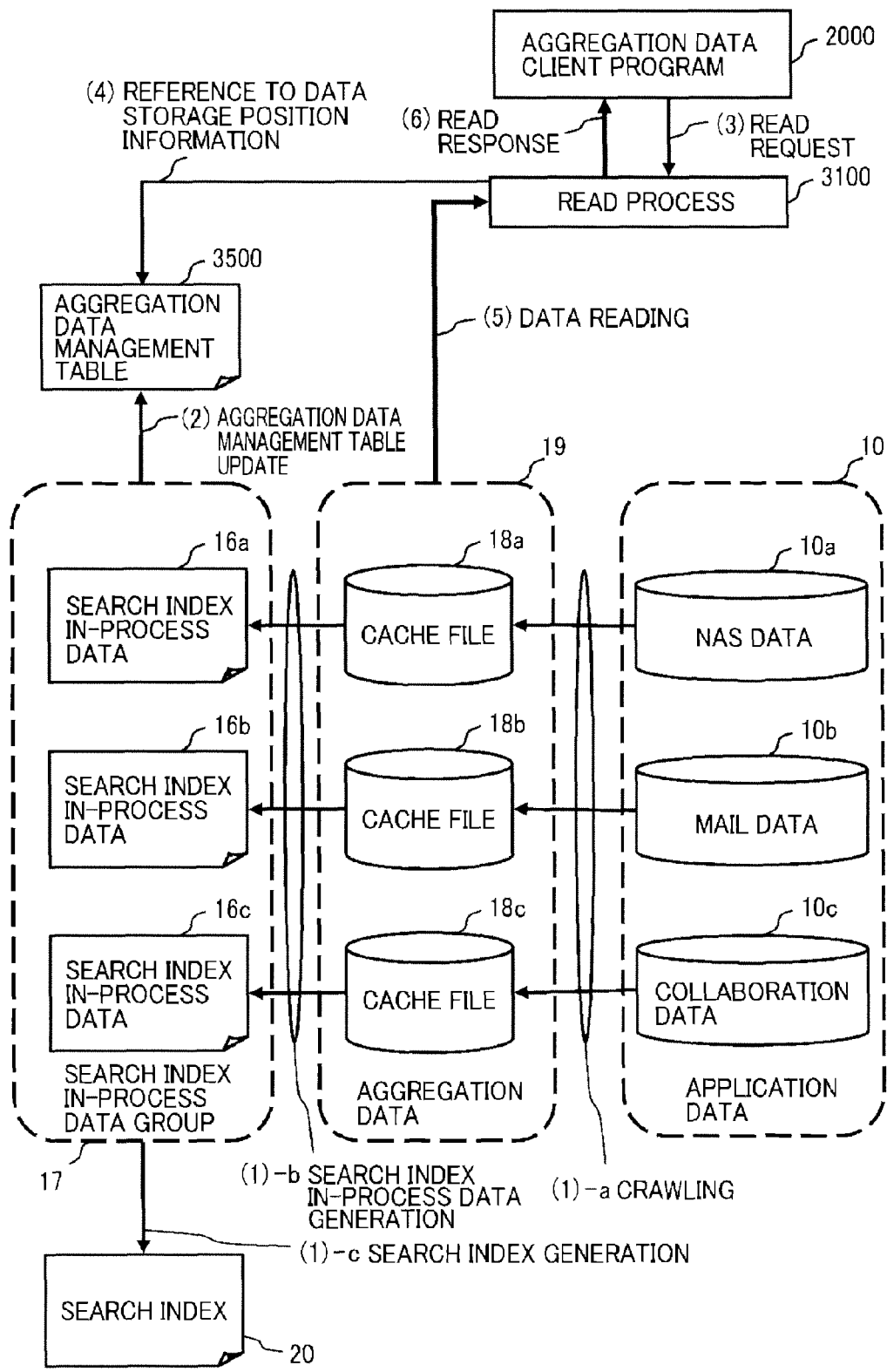
FIG. 30 is a diagram showing an outline of processes according to an embodiment.

FIG. 30 shows a conceptual diagram of the information processing system 100 in the second embodiment.

As shown in FIG. 30, the information processing system 100 according to the second embodiment includes an aggregation data client program 2000, a read process 3100, an aggregation data management table 3500, aggregation data 19 (an aggregate body of cache files 18), application data 10 (NAS data 10*a*, mail data 10*b*, and collaboration data 10*c*), a search index in-process data group 17 (an aggregate body of the search index in-process data 16), and a search index 20.

The search index 20 is an index for identifying a file including keywords transmitted from the client apparatus 2*a* or 2*b*, based on the keywords. For example, the search index 20 can utilize a publicly known data structure called an inverted index.

The search index in-process data 16 is data used to generate the search index 20 and stores identification information of files, a list of the keywords included in the files, and the like.

The search index in-process data 16*a*. 16*b* and 16*c* correspond to the search index in-process data management tables 8200, 8300 and 8400 for NAS, mail, and collaboration, respectively, which will be described later.

Processes performed by the information processing system 100 in the second embodiment will be described by dividing the processes into the following three sections. That is, the three process sections of (a) crawling and search index generation, (b) aggregation data management table update, and (c) content access.

<(a) Crawling and Search Index Generation>

In the processing section for generating crawling and search index (corresponding to the crawler process 8000 and the search index generation process 8100), the enterprise search server 8 stores replicas (cache data) of the contents included in the application data 10 (the NAS data 10*a*, the mail data 10*b*, and the collaboration data 10*c*) in the cache files 18 (corresponding to "(1)-*a* Crawling" in FIG. 30) and generates search index in-process data 16 accordingly (corresponding to "(1)-*b* Search index in-process data generation" in FIG. 30). Thereafter, the enterprise search server 8 generates a search index 20 based on the search index in-process data 16 ("(1)-*c* Search index generation").

The following describes an outline of how the process up to the generation of the search index in-process data 16*a* based on the NAS data 10*a* is performed.

Firstly, the enterprise search server 8 reads data and metadata of a content of the NAS data 10*a* and stores the data and the metadata in the cache file 18*a*. Next, the enterprise search server 8 appends content identification information of the content stored in the cache file 18*a*, storage position information thereof, and the metadata thereof, in the search index in-process data management table 8200 for NAS.

In addition, the following describes an outline of how the process up to the generation of the search index in-process data 16*b* based on the mail data 10*b* is performed.

Firstly, the mail server 6 reads data and metadata of a content in the mail data 10*b* and transmits the data and the metadata to the enterprise search server 8. Next, the enterprise search server 8 stores the received data (and the metadata) of the content in the cache file 18*b*. Lastly, the enterprise search server 8 appends content identification information of the stored content, storage position information thereof, and the metadata thereof, in the search index in-process data management table 8300 for mail.

The process up to the generation of search index in-process data 16 based on the collaboration data 10*c* is performed in the same manner as in the process based on the mail data 10*b*, and thus a description thereof will be omitted (the cache file 18*b* and the search index in-process data management table 8300 for mail are read as the cache file 18*c* and the search index in-process data management table 8400, respectively).

<(b) Aggregation Data Management Table Update>

In the process section of the aggregation data management table update, new entries are added to the aggregation data management table 3500 (this is referred to as an entry addition process) on the basis of entry information included in the search index in-process data 16 in the search index in-process data group 17 (the search index in-process data 16*a*, 16*b*, and 16*c* correspond to the search index in-process data management tables 8200, 8300 and 8400 for NAS, mail, and collaboration, respectively, which will be described later). This process corresponds to (2) Aggregation data management table update in FIG. 30.

An entry to be added includes global content identification information, storage position information of a content, access control information, and the like. The global content identification information is generated by connecting together, as a character string, an application identifier according to the type of the application (NAS, Mail or Collaboration) for the entry and content identification information included in an entry of the search index in-process data 16.

The entry addition process is performed on all the entries included in the search index in-process data 16 in the search index in-process data group 17.

Upon completion of the entry addition process, storage position information of any content included in the cache file 18 in the aggregation data 19 can be identified by using the information in the aggregation data management table 3500.

A further detailed description will be given later of the process of the aggregation data management table update.

<(c) Content Access>

In the content access process section, the aggregation data client program 2000 accesses a content while specifying global content identification information. The process section corresponds to (3) Read request, (4) Reference to data storage position information, (5) Data reading, and (6) Read response in FIG. 30.

The processes (3), (4), (5), and (6) in FIG. 30 correspond to the processes (3), (4), (5), and (6) in FIG. 11 with the cache file 18 in place of the backup file 11.

Hereinafter, descriptions will be given of configuration examples of the tables in the second embodiment.

Figure 31:
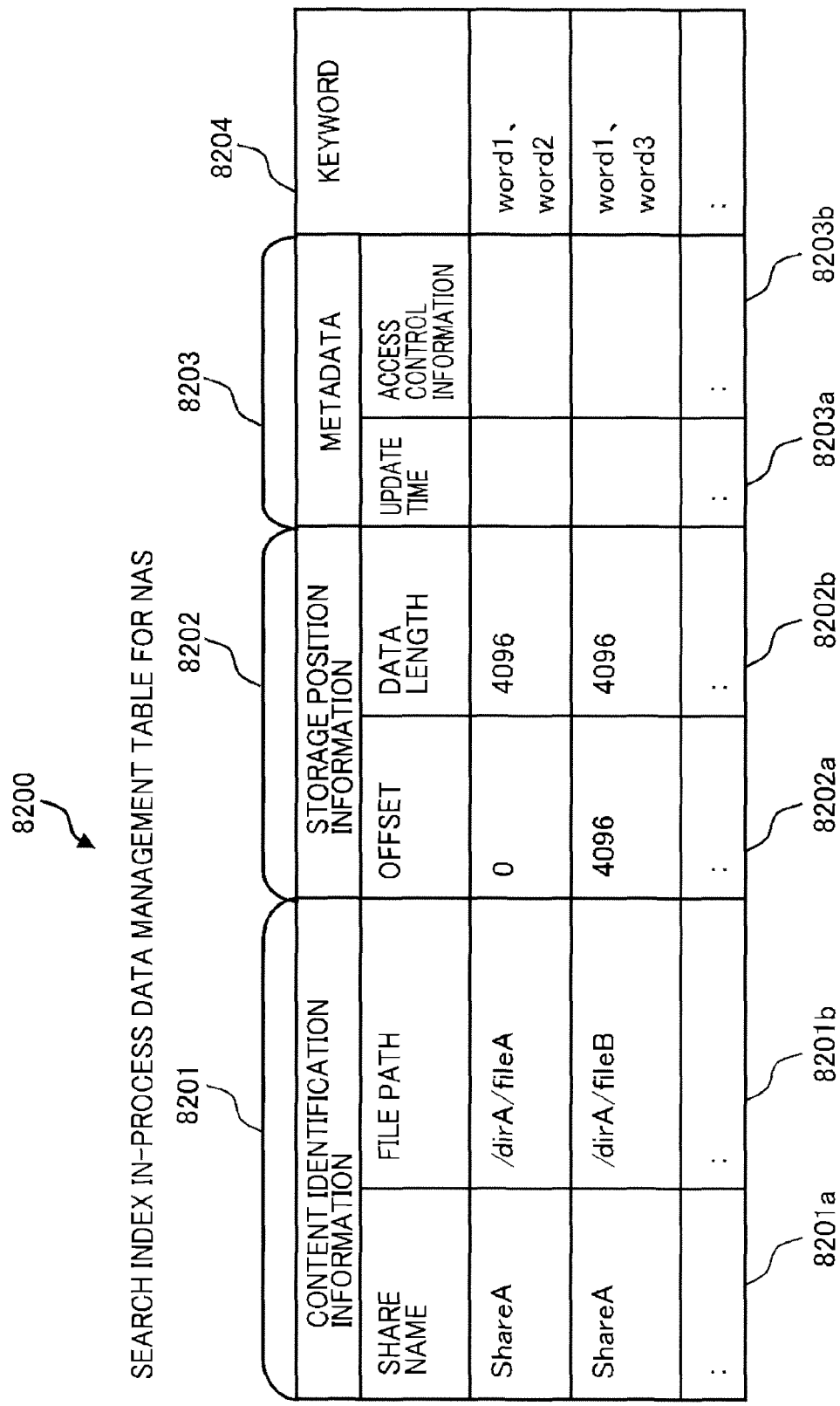
FIG. 31 is a diagram showing a search index in-process data management table according to an embodiment.

FIG. 31 shows a configuration example of the search index in-process data management table 8200 for NAS in the second embodiment.

The search index in-process data management table 8200 for NAS is a table for storing information on contents included in the cache file 18*a* which is a cache file storing the replicas of the contents included in the NAS data 10*a*.

The search index in-process data management table 8200 for NAS is configured with content identification information 8201, storage position information 8202, metadata 8203, and keyword 8204.

The content identification information 8201 is configured with share name 8201*a* and file path 8201*b*. The storage position information 8202 is configured with offset 8202*a* and data length 8202*b*. The metadata 8203 is configured with update time 8203*a* and access control information 8203*b*.

The content identification information 8201 is information for uniquely identifying the contents included in the cache file 18*a* for the NAS data 10*a*. Specific details of the content identification information 8201 are the same as those of the backup catalog information management table 5400 for NAS.

The storage position information 8202 is information on the storage position of a content in the cache file 18*a*. Specific details of the storage position information 8202 are the same as those of the backup catalog information management table 5400 for NAS.

The metadata 8203 is information on the content. Specific details of the metadata 8203 are the same as those of the backup catalog information management table 5400 for NAS.

The keyword 8204 stores therein a list of keywords included in a content corresponding to the content identification information 8201.

FIG. 32 shows a configuration example of the search index in-process data management table 8300 for mail in the second embodiment.

The search index in-process data management table 8300 for mail is a table for storing information on contents included in the cache file 18*b* which is a cache file storing the replicas of the contents included in the mail data 10*b*.

The search index in-process data management table 8300 for mail is configured with content identification information 8301, storage position information 8302, metadata 8303, and keyword 8304.

The content identification information 8301 is configured with account information 8301*a* and mail ID 8301*b*. The storage position information 8302 is configured with offset 8302*a* and data length 8302*b*. The metadata 8303 is configured with update time 8303*a* and access control information 8303*b*.

The content identification information 8301 is information for uniquely identifying the contents included in the cache file 18*b* for mail data 10*b*. Specific details of the content identification information 8301 are the same as those of the backup catalog information management table 5500 for mail.

The storage position information 8302 is information on a storage position of a content in the cache file 18*b*. Specific details of the storage position information 8302 are the same as those of the backup catalog information management table 5500 for mail.

Metadata 8303 is information on the content. Specific details of metadata 8303 are the same as those of the backup catalog information management table 5500 for mail. Keyword 8304 includes a list of keywords included in a content corresponding to the content identification information 8301.

FIG. 33 shows a configuration example of the search index in-process data management table 8400 for collaboration in the second embodiment.

The search index in-process data management table 8400 for collaboration is a table for storing information on the contents included in the cache file 18*c* which is a cache file storing the replicas of the contents included in the collaboration data 10*c*.

The search index in-process data management table 8400 for collaboration is configured with content identification information 8401, storage position information 8402, metadata 8403, and keyword 8404.

The content identification information 8401 is configured with project information 8401*a* and file path 8401*b*. The storage position information 8402 is configured with offset 8402*a* and data length 8402*b*. The metadata 8403 is configured with update time 8403*a* and access control information 8403*b*.

The content identification information 8401 is information for uniquely identifying the contents included in the cache file 18*c* for the collaboration data 10*c*. Specific details of the content identification information 8401 are the same as those of the backup catalog information management table 5600 for collaboration.

The storage position information 8402 is information on a storage position of a content in the cache file 18*c*. Specific details of the storage position information 8402 are the same as those of the backup catalog information management table 5600 for collaboration.

The metadata 8403 is information on the content. Specific details of the metadata 8403 are the same as those of the backup catalog information management table 5600 for collaboration.

The keyword 8404 stores therein a list of keywords (words) included in a content corresponding to the content identification information 8401.

Hereinbelow, a description is given of a process program according to the second embodiment.

Figure 34:
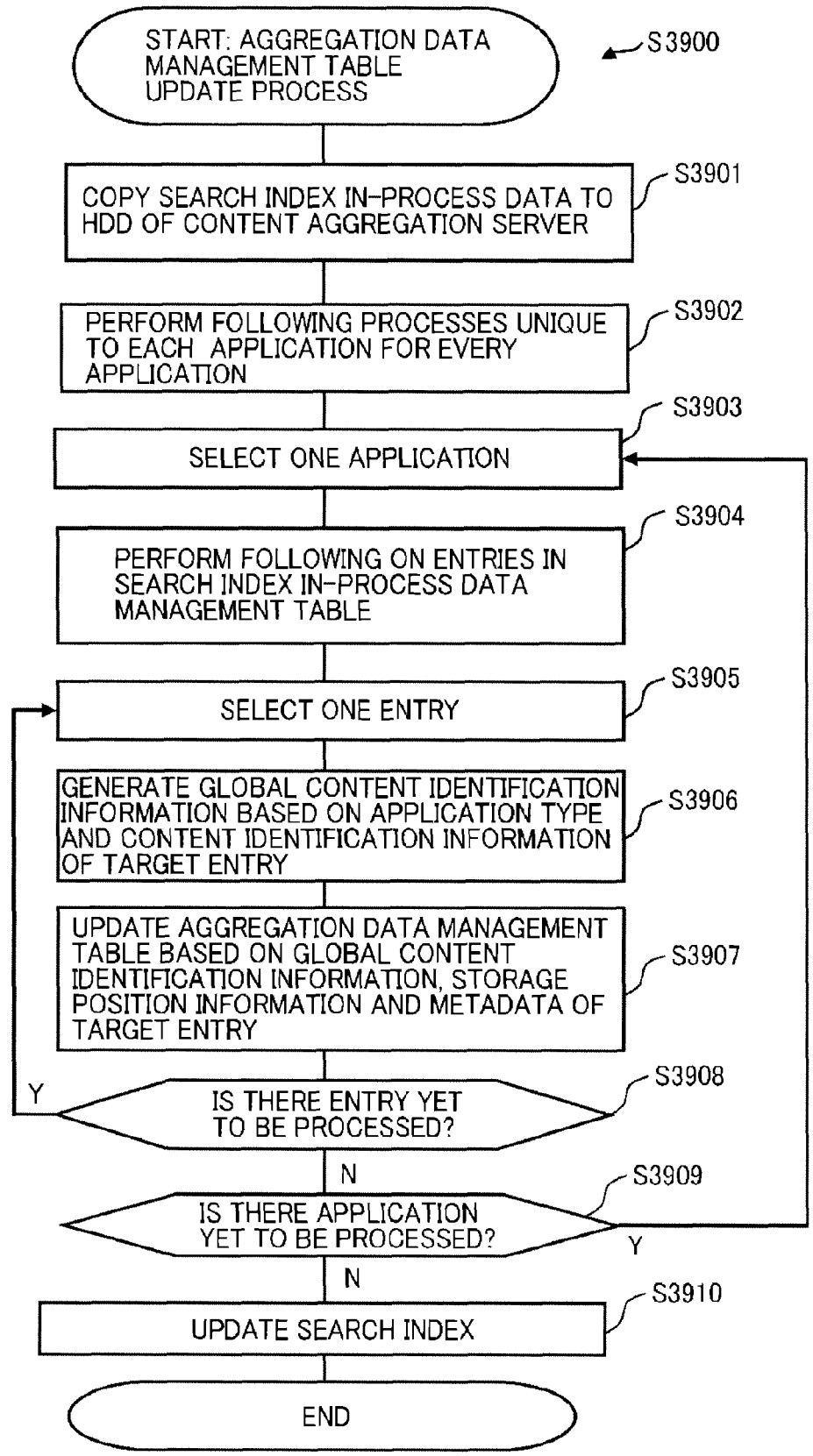
FIG. 34 is a flowchart showing a flow of an aggregation data management table update process according to an embodiment.

FIG. 34 shows an example of a process flow of the aggregation data management table update process 3900 in the second embodiment.

The program for the aggregation data management table update process 3900 is not illustrated, but is stored in the memory 31 of the content aggregation server 3.

In S3901, the content aggregation server 3 copies the search index in-process data group 17 (specifically, the search index in-process data 16*a*, 16*b*, and 16*c*) to the HDD 33 of the content aggregation server 3.

In S3902, the content aggregation server 3 perform is processes after S3903 on all the applications included in the application management table replica 3700.

In S3903, the content aggregation server 3 selects one application from the application management table replica 3700.

In S3904, the content aggregation server 3 identifies a search index in-process data management table (one of the search index in-process data management tables 8200, 8300, and 8400) appropriate for the selected application and performs processes after S3905 on entries included in the identified search index in-process data management table.

In S3905, the content aggregation server 3 selects one (referred to as a target entry) of the entries of the identified search index in-process data management table (8200, 8300 or 8400).

In S3906, the content aggregation server 3 generates global content identification information based on the application type and the content identification information of the target entry.

The concrete step procedures are the same as those in S3006 (provided that the content identification information 5401, 5501, and 5601 are read as content identification information 8201, 8301 or 8401, respectively. In addition, share name 5401*a*, file path 5401*b*, account information 5501*a*, mail ID 5501*b*, project information 5601*a*, and file path 5601*b* are read as share name 8201*a*, file path 8201*b*, account information 8301*a*, mail ID 8301*b*, project information 8401*a*, and file path 8401*b*, respectively.)

In S3907, the content aggregation server 3 updates the aggregation data management table 3500 based on the global content identification information, storage position information, and metadata of the target entry.

Specifically, the content aggregation server 3 firstly adds a new entry to the aggregation data management table 3500. Next, the content aggregation server 3 sets the global content identification information generated in S3906 in the field of the global content identification information 3501 of the new entry.

Further, in the field of file 3503*a* of the new entry, the content aggregation server 3 sets an identifier for a cache file ("File_a" for NAS, "File_b" for Mail, or "File_c" for Collaboration) according to the application type.

Furthermore, in fields of offset 3503*b*, data length 3503*c*, update time 3504*a*, and access control information 3504*b* of the new entry, the content aggregation server 3 sets: corresponding information in the search index in-process data management table 8200 for NAS in the case where the application type is NAS; corresponding information in the search index in-process data management table 8300 for mail in the case where the application type is Mail; or corresponding information in search index in-process data management table 8400 for collaboration in the case where the application type is Collaboration.

In S3908, the content aggregation server 3 judges whether an entry yet to be processed exists. If such entry exists, the content aggregation server 3 proceeds to S3906. If such entry does not exist, the content aggregation server 3 proceeds to S3909.

In S3909, the content aggregation server 3 judges whether an application yet to be processed exists. If the application exists, the content aggregation server 3 proceeds to S3903. If the application does not exist, the content aggregation server 3 proceeds to S3910.

In S3910, the content aggregation server 3 updates the search index 3600 based on the information of the updated aggregation data management table 3500. In each entries of the search index 3600, there is recorded a set of keywords and global content identification information corresponding to the content matching the key words.

As described above, the present embodiment enables a unified way of accessing files generated by application programs configured to store contents in files in different formats, without using a conversion program.

Note that two storage apparatuses 4*s* and 4*t* have been used as storage apparatuses for storing various data in the present embodiment however, a single storage apparatus may store the various data. In addition, the present embodiment has shown an example in which the content aggregation server 3 and the enterprise search server 8 are configured as physically separate server apparatuses however, the content aggregation server 3 and the enterprise search server 8 may be configured as a single server apparatus (information apparatus).

In addition, the replicas of contents, with a combination of the backup server 5 described in the first embodiment and the enterprise search server 8 described in the second embodiment stored in the storage apparatus 4*t*, can be stored in the storage apparatus 4*s*.

In this case, the enterprise search server 8 is made to extract contents which are not described in any of the backup catalog information management tables 5400, 5500, 5600 of the contents stored in the storage apparatus 4*t*. Subsequently, the enterprise search server 8 reads replicas of the extracted contents from the storage apparatus 4*t* and then stores the replicas in the storage apparatus 4*s*.

Thereby, for example, even if contents which are not intended to be backed up by the backup server 5 are stored in the storage apparatus 4*t*, the enterprise search server 8 can also replicate such contents to the storage apparatus 4*s*. Thus, it is possible to store a replica of all the contents stored in the storage apparatus 4*t* in the storage apparatus 4*s*.

This makes it possible for the client apparatus 2 to perform highly accurate data mining in which more files are covered.

Furthermore, an embodiment such as that described below can be employed.

Provided is a method for controlling an apparatus in an information processing system including: a first storage apparatus having a first storage medium; a second storage apparatus having a second storage medium; a first server which is communicatively coupled to the first storage apparatus, stores a content in a file in a first format, and executes a first application program for storing the file in the first storage medium; a second server which is communicatively coupled to the first storage apparatus, stores a content in a file in a second format different from the first format, and executes a second application program for storing the file in the first storage medium; the information apparatus which is communicatively coupled to the first server, the second server, and the second storage apparatus, acquires a replica of a content in each file stored in the first storage medium, and stores the replica in the second storage medium; and a client which is communicatively coupled to the information apparatus, transmits a read request for a content to the information apparatus, and receives the content for which the read request is made. The information apparatus transmits, to the first server, a transmission request for the content in the file generated by the first application program. The information apparatus receives, from the first server, the content read from the first storage medium by the first application program in response to the transmission request. The information apparatus stores the content received by the first content receiver in the second storage medium. The information apparatus transmits, to the second server, a transmission request for the content in the file generated by the second application program. The information apparatus receives, from the second server, the content read from the first storage medium by the second application program in response to the transmission request. The information apparatus stores the content received by the second content receiver in the second storage medium. The information apparatus generates a global identifier allowing the client to uniquely identify each content stored in the second storage medium. The information apparatus stores, in a global identifier management table, storage position information indicating a storage position of each content in the second storage medium and the global identifier of the content in association with each other. The information apparatus receives the read request for the content whose global identifier is specified in the request, reads the content from the storage position identified based on the storage position information stored in the global identifier management table in association with the global identifier, and transmits the content to the client.

As described above, any of the aforementioned embodiments enables a unified way of accessing files generated by application programs for generating files in different formats, without using a conversion program.

Moreover, since a protocol conversion program usable for any application program is not required, a unified means of accessing any data of the application programs can be easily implemented.

Furthermore, in the information processing system including a server device (a group of server devices) on which a plurality of different application programs run, it is possible to provide client apparatuses with the unified means of accessing any data of the application programs.

Still further, a database for holding relations between an identifier of an object and a storage position of the object is generated based on a backup catalog generated by a backup server, and objects are accessed by using this database. In accessing an object, any of the objects based on a plurality of different application programs is accessed in a unified manner by using a single name space. This makes it possible to facilitate implementation of client applications while eliminating the need for understanding a plurality of protocols.

In the aforementioned embodiments, the backup server accesses individual objects managed by various application programs existing in the enterprises. The backup server then interprets and converts the backup catalogs. Accordingly, program development man-hours can be reduced to a large extent.

The preferable embodiments of the present invention have heretofore been described. However, these are exemplifications for explaining the present invention and are not intended to limit the scope of the present invention to the embodiments only. The present invention can be implemented in various other modes.

The invention claimed is:

1. An information apparatus in an information processing system, the information processing system including:
   a first storage apparatus having a first storage medium,
   a second storage apparatus having a second storage medium,
   a first server communicatively coupled to the first storage apparatus, storing a content in a file in a first format and executing a first application program storing the file in the first storage medium,
   a second server communicatively coupled to the first storage apparatus, storing a content in a file in a second format different from the first format, and executing a second application program storing the file in the first storage medium,
   the information apparatus communicatively coupled to the first server, the second server, and the second storage apparatus, acquiring a replica of a content in each file stored in the first storage medium to store in the second storage medium, and
   a client communicatively coupled to the information apparatus, transmitting a read request for a content to the information apparatus and receiving from the information apparatus the content for which the read request is made,
   the information apparatus comprising:
   a first request transmitter configured to transmit, to the first server, a transmission request for the content in the file generated by the first application program;
   a first content receiver configured to receive in response to the transmission request, from the first server, the content read from the first storage medium by the first application program;
   a first content replicator configured to store, in the second storage medium, the content received by the first content receiver;
   a second request transmitter configured to transmit, to the second server, a transmission request for the content in the file generated by the second application program;
   a second content receiver configured to receive, in response to the transmission request from the second server the content read from the first storage medium by the second application program;
   a second content replicator configured to store in the second storage medium the content received by the second content receiver;
   a global identifier generator configured to generate a global identifier allowing the client o uniquely identify each content stored in the second storage medium;
   a global identifier storage configured to store, in a global identifier management table, storage position information indicating a storage position of each content in the second storage medium and the global identifier of the content in association with each other;
   a read processor configured to receive from the client the read request for the content whose global identifier is specified, read the content from the storage position identified based on the storage position information stored in the global identifier management table in association with the global identifier to transmit to the client; and
   a backup executer configured to execute a backup process to store, in the second storage medium, the replica of the content in each file recorded in the first storage medium,
   wherein:
   as the backup process executed by the backup executer,
      the first request transmitter is configured to transmit, to the first server, a transmission request for the content in a file generated by the first application program,
      the first content receiver is configured to receive, from the first server, the content read from the first storage medium by the first application program in response to the transmission request,
      the first content replicator is configured to store in the second storage medium the content received by the first content receiver,
      the second request transmitter is configured to transmit to the second server, a transmission request for the content in a file generated by the second application program,
      the second content receiver is configured to receive, from the second server, the content read from the first storage medium by the second application program in response to the transmission request, and
      the second content replicator is configured to store in the second storage medium the content received by the second content receiver,
   wherein:
      every time the backup process is executed, the backup executer is configured to record a time when the backup process is executed in a backup management table, and
      when executing anew the backup process, the backup executer is configured to compare a time when the backup process is executed last time with a content update time recorded in each content stored in the first storage medium to execute the backup process for only a content updated alter the backup process executed last time, and
   wherein:
      the first content replicator is configured to store, in the replica management table, content identification information described in the content transmitted from the first server, identification information of the first application program used to identify the content, and generation information indicating how many times the content has been backed up, in association with one another, the second content replicator is configured to store, in the replica management table, content identification information described in the content transmitted from the second server, identification information of the second application program used to identify the content, and generation information indicating how many times the content has been backed up, in association with one another, when a content transmitted from the first server includes description of content identification information identical to identification information already stored in the replica management table, the first content replicator generates is configured to generate new generation information by incrementing by one the latest generation information in the generation information associated with the identification information and then store, in the replica management table, the new generated generation information, the content identification information, and the identification information of the first application program based on which the content is identified, in association with one another, when a content transmitted from the second server includes description of content identification information identical to identification information already stored in the replica management table, the second content replicator is configured to generate new generation information by incrementing by one the latest generation information in the generation information associated with the identification information and then store, in the replica management table, the new generated generation information, the content identification information, and the identification information of the second application program used to identify the content, in association with one another, and the global identifier generator is configured to combine the content identification information of each content stored in the replica management table and the identification information of the application program associated with the content identification information, and generate the global identifier for uniquely identifying the content, and the global identifier storage part stores, in a global identifier management table, the storage position information indicating the storage position of each content in the second storage medium, generation information of the content stored at the storage position, and the global identifier of the content, in association with one another.

2. The information apparatus according to claim 1, wherein for a content transmitted from the first server, the first content replicator is configured to store content identification information described in the content in a replica management table in association with identification information of the first application program identifying the content, for a content transmitted from the second server, the second content replicator is configured to store content identification information described in the content in the replica management table in association with identification information of the second application program identifying the content.

3. The information apparatus according to claim 2, wherein the global identifier is configured to generate a global identifier for uniquely identifying each content by combining the content identification information stored in the replica management table with the identification information of the application program associated with identification information on a content basis.

4. The information apparatus according to claim 1, further comprising an update processor configured to, upon receipt of an updated content and an update request for the content whose global identifier is specified in the request, write the updated content to the second storage medium, and store storage position information and the global identifier specified in the update request, in association with each other in an update management table, the storage position information indicating a storage position at which the updated content is stored in the second storage medium.

5. The information apparatus according to claim 4, wherein the storage position in the second storage medium where the updated content is stored is different from a storage position in the second storage medium where the content was stored before the content is updated.

6. The information apparatus according to claim 5, wherein upon receipt of the read request for the content from the client, in a case the read request specifying the global identifier identical to a global identifier is stored in the update management table, the read processor is configured to read the content from a storage position identified based on the storage position information stored in the update management table in association with the global identifier and transmits the content to the client.

7. The information apparatus according to claim 1, further comprising:
a delete processor configured to, upon receipt of a delete request for a content whose global identifier is specified in the request from the client, delete the global identifier stored in the global identifier management table without deleting from the second storage medium the content identified based on the global identifier.

8. The information apparatus according to claim 1, further comprising:
a search index generator configured to extract, from each content stored in the second storage medium, a word described in the content, and generate a search index in which the extracted word and a global identifier of the content including the extracted word are stored in association with each other on a word basis; and
a search processor configured to receive a content search request specifying a word from the client and transmitting, to the client, a list of global identifiers stored in the search index in association with the word.

9. The information apparatus according to claim 1, further comprising an access manager configured to store a global identifier generated by the global identifier generator and information indicating a user permitted to read the content identified based on the global identifier, in an access management table in association with each other on a global identifier basis, wherein
upon receipt of the read request for a content whose global identifier is specified in the request, when information indicating a user, described in the read request, having transmitted the read request is stored in the access management table in association with the global identifier described in the read request, the read processor is configured to read the content from a storage position identified based on the storage position information stored in the global identifier management table in association with the global identifier described in the read request and transmits the content to the client.

10. The information apparatus according to claim 1, further comprising: a content collector configured to execute a content collection process for storing, in the second storage medium, the replicas of the content in each file stored in the first storage medium;

a file index generator configured to extract, from each content stored in the second storage medium, a word described in the content, and generate a file index in which the extracted word and an identifier of the file including description of the extracted word are stored in association with each other on a word basis; and an enterprise search executer configured to receive a file search request specifying a word from the client and transmits, to the client, a list of file identifiers stored in the file index in association with the word, wherein as the content collection process executed by the content collector, the first request transmitter is configured to transmit, to the first server, a transmission request for the content in a file generated by the first application program, the first content receiver is configured to receive, from the first server, the content read from the first storage medium by the first application program in response to the transmission request, the first content replicator is configured to store in the second storage medium the content received by the first content receiver, the second request transmitter is configured to transmit, to the second server, a transmission request for the content in a file generated by the second application program, the second content receiver is configured to receive, from the second server, the content read from the first storage medium by the second application program in response to the transmission request, and the second content replicator is configured to store in the second storage medium the content received by the second content receiver.

11. An information apparatus, in an information processing system, the information processing system including:

a first storage apparatus having a first storage medium, a second storage apparatus having a second storage medium, a first server communicatively coupled to the first storage apparatus, storing a content in a file in a first format, and executing a first application program storing the file in the first storage medium, a second serve communicatively coupled to the first storage apparatus, storing a content in a file in a second format different from the first format, and executing a second application program storing the file in the first storage medium, the information apparatus communicatively coupled to the first server, the second server, and the second storage apparatus, acquiring a replica of a content in each file stored in the first storage medium to store in the second storage medium, and a client communicatively coupled to the information apparatus, transmitting a read request for a content to the information apparatus, and receiving from the information apparatus the content for which the read request is made, the information apparatus comprising:

a first request transmitter configured to transmit, to the first server, a transmission request for the content in the file generated by the first application program;

a first content receiver configured to receive in response to the transmission request, from the first server, the content read from the first storage medium by the first application program;

a first content replicator configured to store, in the second storage medium, the content received by the first content receiver;

a second request transmitter configured to transmit, to the second server, a transmission request for the content in the file generated by the second application program;

a second content receiver configured to receive, in response to the transmission request, from the second server the content read from the first storage medium by the second application program;

a second content replicator configured to store in the second storage medium the content received by the second content receiver;

a global identifier generator configured to generate a global identifier allowing the client to uniquely identify each content stored in the second storage medium;

a global identifier storage configured to store, in a global identifier management table, storage position information indicating a storage position of each content in the second storage medium and the global identifier of the content in association with each other;

a read processor configured to receive from the client the read request for the content whose global identifier is specified, read the content from the storage position identified based on the storage position information stored in the global identifier management table in association with the global identifier to trans client; and a backup executer configured to execute a backup process to store, in the second storage medium, the replica of the content in each file recorded in the first storage medium, wherein:

as the backup process executed by the hack executer, the first request transmitter is configured to transmit, to the first server, a transmission request for the content in a file generated by the first application program, the first content receiver is configured to receive, from the first server, the content read from the first storage medium by the first application program in response to the transmission request, the first content replicator is configured to store in the second storage medium the content received by the first content receiver, the second request transmitter is configured to transmit, to the second server, a transmission request for the content in a file generated by the second application program, the second content receiver is configured to receive, from the second server, the content read from the first storage medium by the second application program in response to the transmission request, and the second content replicator is configured to store in the second storage medium the content received by the second content receiver, wherein:

every time the backup process is executed, the backup executer is configured to record a time when the backup process is executed in a backup management table, and when executing anew the backup process, the backup executer is configured to compare a time when the backup process is executed last time with a content update time recorded in each content stored in the first storage medium to execute the backup process for only a content updated after the backup process executed last time, and wherein:
the first content replicator is configured to store, in the replica management table, content identification information described in the content transmitted from the first server, identification information of the first application program used to identify the content, and generation information indicating how many times the content has been backed up, in association with one another,
the second content replicator is configured to store, in the replica management table, content identification information described in the content transmitted from the second server, identification information of the second application program used to identify the content, and generation information indicating how many times the content has been backed up, in association with one another,
when a content transmitted from the first server includes description of content identification information identical to identification information already stored in the replica management table, the first content replicator is configured to generate new generation information by incrementing by one the latest generation information in the generation information associated with the identification information and then store, in the replica management table, the new generated generation information, the content identification information, and the identification information of the first application program based on which the content is identified, in association with one another,
when a content transmitted from the second server includes description of content identification information identical to identification information already stored in the replica management table, the second content replicator is configured to generate new generation information by incrementing by one the latest generation information in the generation information associated with the identification information and then store, in the replica management table, the new generated generation information, the content identification information, and the identification information of the second application program used to identify the content, in association with one another, and
the global identifier generator is configured to combine the content identification information of each content stored in the replica management table and the identification information of the application program associated with the content identification information, and generate the global identifier for uniquely identifying the content, and the global identifier storage part stores, in a global identifier management table, the storage position information indicating the storage position of each content in the second storage medium, generation information of the content stored at the storage position, and the global identifier of the content, in association with one another,
wherein the information apparatus further comprising:
an alias generator configured to generate a detail global identifier for uniquely identifying each content by combining the global identifier stored in the global identifier management table with the generation information associated with the global identifier for each piece of the generation information of the global identifier; and
an alias manager configured to store, in an alias management table, the global identifier stored in the global identifier management table, the generation information associated with the global identifier, and the detail global identifier generated based on the global identifier and the generation information, in association with one another for each piece of the generation information of the global identifier, wherein upon receipt of a read request for a content whose detail global identifier is specified in the request from the client, the read processor is configured to identify a storage position of the read target content in the global identifier management table on a basis of the global identifier and the generation information stored in the alias management table in association with the detail global identifier, and the read processor is configured to read the content from the storage position and transmit the content to the client.

12. An information apparatus in an information processing system, the information processing system including:
a first storage apparatus having a second storage medium,
a second storage apparatus having a second storage medium,
a first server communicatively coupled to the first storage apparatus, storing a content in a file in a first format, and executing a first application program storing the file in the first storage medium,
a second server communicatively coupled to the first storage apparatus, storing a content in a file in a second format different from the first format, and executing a second application program storing the file in the first storage medium,
the information apparatus communicatively coupled to the first server, the second server and the second storage apparatus, acquiring a replica of a content in each file stored in the first storage medium to store in the second storage medium, and
a client communicatively coupled to the information apparatus, transmitting a read request for a content to the information apparatus, and receiving from the information apparatus the content for which the read request is made,
the information apparatus comprising:
a first request transmitter configured to transmit, to the first server, a transmission request for the content in the file generated by the first application program;
a first content receiver configured to receive in response to the transmission request, from the first server, the content read from the first storage medium by the first application program;
a first content replicator configured to store, in the second storage medium, the content received by the first content receiver;
a second request transmitter configured to transmit, to the second server, a transmission request for the content in the file generated by the second application program;
a second content receiver configured to receive, in response to the transmission request, from the second server the content read from the first storage medium by the second application program;
a second content replicator configured to store in the second storage medium the content received by the second content receiver;
a global identifier generator configured to generate a global identifier allowing the client to uniquely identify each content stored in the second storage medium;
a global identifier storage configured to store, in a global identifier management table, storage position information indicating a storage position of each content in the second storage medium and the global identifier of the content in association with each other;

a read processor configured to receive from the client the read request for the content whose global identifier is specified, read the content from the storage position identified based on the storage position information stored in the global identifier management table in association with the global identifier to transmit to the client; and wherein:

for a content transmitted from the first server, the first content replicator is configured to store content identification information described in the content in a replica management table in association with identification information of the first application program identifying the content, for a content transmitted from the second server, the second content replicator is configured to store content identification information described in the content in the replica management table in association with identification information of the second application program identifying the content, wherein the global identifier generator is configured to generate a global identifier for uniquely identifying each content by combining the content identification information stored in the replica management table with the identification information of the application program associated with identification information on a content basis, wherein the information apparatus comprises an update processor configured to, upon receipt of an updated content and an update request for the content whose global identifier is specified in the request, write the updated content to the second storage medium, and store storage position information and the global identifier specified in the update request, in association with each other in an update management table, the storage position information indicating a storage position at which the updated content is stored in the second storage medium, wherein upon receipt of the read request for the content from the client, in a case the read request specifying the global identifier identical to a global identifier is stored in the update management table, the read processor is configured to read the content from a storage position identified based on the storage position information stored in the update management table in association with the global identifier and transmit the content to the client, wherein the information apparatus comprises a delete processor configured to, upon receipt of a delete request for a content whose global identifier is specified in the request from the client, delete the global identifier stored in the global identifier management table without deleting from the second storage medium the content identified based on the global identifier, wherein the information apparatus comprises a search index generator configured to extract, from each content stored in the second storage medium, a word described in the content, and generate a search index in which the extracted word and a global identifier of the content including the extracted word are stored in association with each other on a word basis;

a search processor configured to receive a content search request specifying a word from the client and transmitting, to the client, a list of global identifiers stored in the search index in association with the word; and an access manager which configured to store a global identifier generated by the global identifier generator and information indicating a user permitted to read the content identified based on the global identifier, in an access management table in association with each other on a global identifier basis, wherein upon receipt of the read request for a content whose global identifier is specified in the request, when information indicating a user, described in the read request, having transmitted the read request is stored in the access management table in association with the global identifier described in the read request, the read processor is configured to read the content from a storage position identified based on the storage position information stored in the global identifier management table in association with the global identifier described in the read request and transmit the content to the client, wherein the information apparatus comprises a backup executer configured to execute a backup process to store, in the second storage medium, the replica of the content in each file recorded in the first storage medium, wherein as the backup process executed by the backup executer, the first request transmitter is configured to transmit, to the first server, a transmission request for the content in a file generated by the first application program, the first content receiver is configured to receive, from the first server, the content read from the first storage medium by the first application program in response to the transmission request, the first content replicator is configured to store in the second storage medium the content received by the first content receiver, and the second request transmitter is configured to transmit, to the second server, a transmission request for the content in a file generated by the second application program, the second content receiver is configured to receive, from the second server, the content read from the first storage medium by the second application program in response to the transmission request, and the second content replicator is configured to store in the second storage medium the content received by the second content receiver, wherein every time the backup process is executed, the backup executer is configured to record a time when the backup process is executed in a backup management table, and when executing anew the backup process, the backup executer is configured to compare a time when the backup process is executed last time with a content update time recorded in each content stored in the first storage medium to execute the backup process for only a content updated after the backup process executed last time, wherein the first content replicator is configured to store, in the replica management table, content identification information described in the content transmitted from the first server, identification information of the first application program used to identify the content, and generation information indicating how many times the content has been backed up, in association with one another, the second content replicator is configured to store, in the replica management table, content identification information described in the content transmitted from the second server, identification information of the second application program used to identify the content, and generation information indicating how many times the content has been backed up, in association with one another, when a content transmitted from the first server includes description of content identification information identical to identification information already stored in the replica management table, the first content replicator is configured to generate new generation information by incrementing by one the latest generation information in the generation information associated with the identification information and then store, in the replica management table, the new generated generation information, the content identification information, and the identification information of the first application program based on which the content is identified, in association with one another, when a content transmitted from the second server includes description of content identification information identical to identification information already stored in the replica management table, the second content replicator is configured to generate new generation information by incrementing by one the latest generation information in the generation information associated with the identification information and then store, in the replica management table, the new generated generation information, the content identification information, and the identification information of the second application program used to identify the content, in association with one another, the global identifier generator is configured to combine the content identification information of each content stored in the replica management table and the identification information of the application program associated with the content identification information, and thereby generate the global identifier for uniquely identifying the content, and the global identifier storage part is configured to store, in a global identifier management table, the storage position information indicating the storage position of each content in the second storage medium, generation information of the content stored at the storage position, and the global identifier of the content, in association with one another, wherein the information apparatus comprises:

an alias generator configured to generate a detail global identifier for uniquely identifying each content by combining the global identifier stored in the global identifier management table with the generation information associated with the global identifier for each piece of the generation information of the global identifier; and an alias manager configured to store, in an alias management table, the global identifier stored in the global identifier management table, the generation information associated with the global identifier, and the detail global identifier generated based on the global identifier and the generation information, in association with one another for each piece of the generation information of the global identifier, wherein upon receipt of a read request for a content whose detail global identifier is specified in the request from the client, the read processor is configured to identify a storage position of the read target content in the global identifier management table on a basis of the global identifier and the generation information stored in the alias management table in association with the detail global identifier, and the read processor is configured to read the content from the storage position and transmit the content to the client, wherein the information apparatus comprises:

a content collector configured to execute a content collection process for storing, in the second storage medium, the replicas of the content in each file stored in the first storage medium;

a file index generator configured to extract, from each content stored in the second storage medium, a word described in the content, and generate a file index in which the extracted word and an identifier of the file including description of the extracted word are stored in association with each other on a word basis; and an enterprise search executer configured to receive a file search request specifying a word from the client and transmit, to the client, a list of file identifiers stored in the file index in association with the word, wherein as the content collection process executed by the content collector, the first request transmitter is configured to transmit, to the first server, a transmission request for the content in a file generated by the first application program, the first content receives is configured to receive, from the first server, the content read from the first storage medium by the first application program in response to the transmission request, the first content replicator is configured to store in the second storage medium the content received by the first content receiver, the second request transmitter is configured to transmit, to the second server, a transmission request for the content in a file generated by the second application program, the second content receiver is configured to receive, from the second server, the content read from the first storage medium by the second application program in response to the transmission request, and the second content replicator is configured to store in the second storage medium the content received by the second content receiver.

\* \* \* \* \*